(12) United States Patent
Chopcinski et al.

(10) Patent No.: US 8,065,051 B2
(45) Date of Patent: Nov. 22, 2011

(54) CONTEXT-SENSITIVE HELP FOR DISPLAY DEVICE ASSOCIATED WITH POWER DRIVEN WHEELCHAIR

(75) Inventors: Gary E. Chopcinski, North Ridgeville, OH (US); Thomas A. Drobnak, Olmsted Township, OH (US)

(73) Assignee: Invacare Corporation, Elyria, OH (US)

( * ) Notice: Subject to any disclaimer, the term of this patent is extended or adjusted under 35 U.S.C. 154(b) by 911 days.

(21) Appl. No.: 11/513,854

(22) Filed: Aug. 31, 2006

(65) Prior Publication Data

US 2007/0056782 A1 Mar. 15, 2007

Related U.S. Application Data

(60) Provisional application No. 60/712,987, filed on Aug. 31, 2005, provisional application No. 60/727,005, filed on Oct. 15, 2005, provisional application No. 60/726,983, filed on Oct. 15, 2005, provisional application No. 60/726,666, filed on Oct. 15, 2005, provisional application No. 60/726,981, filed on Oct. 15, 2005, provisional application No. 60/727,249, filed on Oct. 15, 2005, provisional application No. 60/727,250, filed on Oct. 15, 2005.

(51) Int. Cl.
*G06F 3/01* (2006.01)
*G06F 30/048* (2006.01)
*G06F 17/00* (2006.01)
*G06F 3/033* (2006.01)
*A61G 5/04* (2006.01)
*A61G 5/10* (2006.01)

(52) U.S. Cl. .................. 701/36; 701/1; 701/22; 701/49

(58) Field of Classification Search .................. 180/907, 180/65.1, 65.8; 280/250.1; 715/708, 810, 715/811, 841; 701/1, 22, 36, 49
See application file for complete search history.

(56) References Cited

U.S. PATENT DOCUMENTS 1,114,948 A 10/1914 Walker
(Continued)

FOREIGN PATENT DOCUMENTS

DE 3923937 A1 1/1990
(Continued)

OTHER PUBLICATIONS

Quickie HHP Programming Tree, Sunrise Medical, Inc., Longmont, Colorado (7 pages).
(Continued)

*Primary Examiner* — Khoi Tran
*Assistant Examiner* — Dale Moyer
(74) *Attorney, Agent, or Firm* — Calfee, Halter & Griswold LLP

(57) ABSTRACT

An apparatus and method for providing help information on a display device associated with a power driven wheelchair is provided. In one embodiment, the method includes: a) displaying screen content displayed on the display device during operation or support of the power driven wheelchair, b) detecting selective activation of a first input device, c) in response to detection of the first input device activation, selecting help information content from a collection of help information, the selected help information content being contextually related to the screen content displayed on the display device, and d) displaying the contextually-related help information content on the display device. In one embodiment, the apparatus includes: a display device, a first input device, and a microcontroller in operative communication with the display device and the first input device.

25 Claims, 21 Drawing Sheets

U.S. PATENT DOCUMENTS

| | | |
|---|---|---|
| 2,759,525 A | 8/1956 | Reis |
| 4,207,959 A | 6/1980 | Youdin et al. |
| 4,736,921 A | 4/1988 | Zane et al. |
| 4,779,884 A | 10/1988 | Minati |
| 4,951,766 A | 8/1990 | Basedow et al. |
| 5,033,000 A | 7/1991 | Littlejohn et al. |
| 5,157,768 A | 10/1992 | Hoeber et al. |
| 5,187,797 A * | 2/1993 | Nielsen et al. ............ 715/708 |
| 5,234,066 A | 8/1993 | Ahsing et al. |
| 5,245,558 A | 9/1993 | Hachey |
| 5,248,007 A | 9/1993 | Watkins et al. |
| 5,261,715 A | 11/1993 | Blatt et al. |
| 5,299,824 A | 4/1994 | Roberts et al. |
| 5,516,021 A | 5/1996 | Douglass |
| 5,547,038 A | 8/1996 | Madwed |
| 5,555,949 A | 9/1996 | Stallard et al. |
| 5,647,520 A | 7/1997 | McDaid |
| 5,718,442 A | 2/1998 | Alexander et al. |
| 5,794,730 A | 8/1998 | Kamen |
| 5,899,526 A | 5/1999 | LaPointe et al. |
| 5,961,561 A | 10/1999 | Wakefield, II |
| 6,068,280 A | 5/2000 | Torres |
| 6,154,690 A | 11/2000 | Coleman |
| 6,170,598 B1 | 1/2001 | Furukawa |
| 6,290,011 B1 | 9/2001 | Langaker et al. |
| 6,354,390 B1 | 3/2002 | Uchiyama et al. |
| 6,409,265 B1 | 6/2002 | Koerlin et al. |
| 6,425,635 B1 | 7/2002 | Pulver |
| 6,588,792 B1 | 7/2003 | Koerlin et al. |
| 6,688,571 B1 | 2/2004 | Pauls |
| 6,715,784 B2 | 4/2004 | Koerlin et al. |
| 6,816,762 B2 | 11/2004 | Hensey et al. |
| 6,819,981 B2 | 11/2004 | Wakefield, II et al. |
| 6,832,745 B2 | 12/2004 | Lindsay |
| 6,842,692 B2 | 1/2005 | Fehr et al. |
| 6,866,107 B2 | 3/2005 | Heinzmann et al. |
| 6,868,931 B2 | 3/2005 | Morrell et al. |
| 6,871,122 B1 | 3/2005 | Wakefield, II |
| 6,874,591 B2 | 4/2005 | Morrell et al. |
| 6,926,106 B2 | 8/2005 | Richey, II et al. |
| 6,938,923 B2 | 9/2005 | Mulhern et al. |
| 6,974,194 B2 | 12/2005 | Schreiber et al. |
| 6,976,699 B2 | 12/2005 | Koerlin |
| 6,989,642 B2 | 1/2006 | Wakefield, II et al. |
| 6,991,292 B2 | 1/2006 | Kasten |
| 7,003,381 B2 | 2/2006 | Wakefield, II |
| 7,083,019 B2 | 8/2006 | Chiou et al. |
| 7,113,854 B2 | 9/2006 | Mansell et al. |
| 7,148,638 B2 | 12/2006 | Wakefield, II |
| 7,246,856 B2 | 7/2007 | Kruse et al. |
| 7,296,312 B2 | 11/2007 | Menkedick et al. |
| 7,310,776 B2 * | 12/2007 | Mansell et al. ............ 715/744 |
| 7,403,844 B2 | 7/2008 | Chopcinski et al. |
| 7,461,897 B2 | 12/2008 | Kruse et al. |
| 2003/0001875 A1 * | 1/2003 | Black et al. ............ 345/708 |
| 2003/0109973 A1 | 6/2003 | Hensey et al. |
| 2003/0127261 A1 | 7/2003 | Borroni-Bird et al. |
| 2004/0002305 A1 | 1/2004 | Byman-Kivivuori et al. |
| 2004/0094936 A1 | 5/2004 | Koerlin |
| 2004/0195173 A1 | 10/2004 | Huang et al. |
| 2004/0210351 A1 | 10/2004 | Wakefield, II et al. |
| 2004/0227728 A1 | 11/2004 | McAlindon |
| 2004/0252341 A1 | 12/2004 | Adachi et al. |
| 2004/0259591 A1 | 12/2004 | Grams et al. |
| 2005/0075758 A1 | 4/2005 | Wakefield, II |
| 2005/0076308 A1 | 4/2005 | Mansell et al. |
| 2005/0080518 A1 | 4/2005 | Wakefield, II |
| 2005/0082995 A1 | 4/2005 | Wakefield, II et al. |
| 2005/0195173 A1 | 9/2005 | McKay |
| 2005/0236208 A1 | 10/2005 | Runkles et al. |
| 2005/0236217 A1 | 10/2005 | Koelin et al. |
| 2006/0247836 A1 | 11/2006 | Mansell et al. |
| 2007/0050096 A1 * | 3/2007 | Mattes et al. ............ 701/1 |
| 2007/0050111 A1 | 3/2007 | Mattes et al. |
| 2007/0055424 A1 * | 3/2007 | Peters et al. ............ 701/36 |
| 2007/0056780 A1 * | 3/2007 | Jaenke et al. ............ 180/65.1 |
| 2007/0056781 A1 * | 3/2007 | Mattes et al. ............ 180/65.1 |
| 2007/0067072 A1 | 3/2007 | Chopcinski et al. |
| 2007/0074917 A1 | 4/2007 | Jaenke et al. |
| 2007/0080003 A1 | 4/2007 | Koerlin et al. |
| 2007/0130522 A1 * | 6/2007 | Mansell et al. ............ 715/744 |
| 2007/0262629 A1 | 11/2007 | Kruse et al. |
| 2008/0030463 A1 * | 2/2008 | Forest ............ 345/156 |
| 2008/0097254 A1 | 4/2008 | Torres et al. |
| 2008/0249694 A1 * | 10/2008 | Jaenke et al. ............ 701/69 |
| 2009/0121532 A1 | 5/2009 | Kruse et al. |
| 2009/0153370 A1 | 6/2009 | Cooper et al. |

FOREIGN PATENT DOCUMENTS

| | | |
|---|---|---|
| EP | 0345785 A2 | 12/1989 |
| EP | 436103 A2 | 7/1991 |
| EP | 1148394 A2 | 10/2001 |
| GB | 2222701 A | 3/1990 |
| JP | 2008-194183 | 8/2008 |
| JP | 2009-078028 | 4/2009 |
| JP | 2009-261472 | 11/2009 |
| JP | 2010-017354 | 1/2010 |
| WO | WO 03/034967 | 5/2003 |
| WO | 2005/037168 A1 | 4/2005 |
| WO | WO 2005/032924 | 4/2005 |
| WO | WO 2005/039473 | 5/2005 |
| WO | WO 2005/039930 | 5/2005 |

OTHER PUBLICATIONS

Specialty Control Set Up & Programming Guide, QR-SCM Owner's Manual, Quickie Electronics Platform powered by Delphi, Sunrise Medical, Inc., Longmont, Colorado, 101748 Rev. A, 2006 (15 pages).

QR-ED Owners's Manual, Quickie Enhanced Display, Sunrise Medical, Inc., Longmont,Colorado, 10519 Rev. A, 2006 (51 pages).

Service Manual, Quickie Rhythm & Groove, Sunrise Medical, Inc., Longmont, Colorado, 014061 Rev. A, 2006 (104 pages).

Dynamic, DX Remote Joystick Module (RJM) Installation Manual, No. 60014, iss. 4, Apr. 1997, 13 pgs.

Dynamic, DX Attendant Control Unit (ACU) Installation Manual, No. 60013, issue 4, Nov. 1998, 30 pgs.

Dynamic, DX Dolphin Remote (DX-Rem34) Installation Manual, No. 60025, issue 5, Jan. 1999, 69 pgs.

Dynamic, DX Two Actuator Module (TAM) Installation Manual, No. 60026, issue 5, Jul. 1998, 45 pgs.

Dynamic, DX-REMG90, DX-REMG90A, DX-REMG90T Master Remotes Installation Manual, GBK64048, issue 1, Jan. 2005, 61 pgs.

Dynamic, DX Power Module (PMB, PMB1, PMB2, PMB-S) Installation Manual, No. 63824, issue 2, Jul. 1998, 85 pgs.

Dynamic, DX-GB, The Complete Gearless Brushless DC Control System brochure, 2 pgs., date unknown.

Dynamic, Actuator Remote Control Module DX-ARC5 Installation Manual, copyright 1998, Jun. 2004, 10 pgs.

Flash, New and Notable Product Design, p. 28 from Design News Oct. 10, 2005.

Invacare Corporation—Brochure "Invacare Storm Series TDX Power Wheelchairs, including Formula Powered Seating", Form No. 03-018, rev. Jul. 2004, 32 pgs.

Invacare Corporation—Brochure—"Invacare Tarsys Series Powered Seating Systems", Form No. 00-313, rev. Sep. 2002, 16 pgs.

Invacare Corporation—Brochure—"Storm Series Power Wheelchairs including Fomula CG Powered Seating, MK6i Electronics", 16 pgs., 2006, Form No. 06-040.

Invacare, 3G Storm Series Wheelchair Bases, Arrow RWD, Torque SP RWD, Ranger X RWD, dated Jun. 30, 2006, 88 pgs., Part No. 1143151.

Linak, Product Data Sheet, Actuator LA30, 8 pgs, Chapter 2.1, copyright May 2002.

Linak, Product Data Sheet, Actuator LA31, 8 pgs, Chapter 5.8.2, copyright May 2005.

Mechanical Engineering magazine article "Taking sensors out of motors" 5 pgs printed Aug. 15, 2006, http://www.memagazine.org/backissues/january98/features/sensout/sensout.html.

PG Drives Technology—R-Net Rehab-Powerchair Control System (Presentation) pp. 30, date unknown.

Quantum Rehab Innovative Rehab Solutions, a division of Pride Mobility Products Corp., one page brochure, Q-Logic Drive Control System, QLOGIC-3-13-06.

Teknic, Inc., "The price/performance leader for OEM machine automation", Investigating Servo Architectures, 14 pgs. printed Aug. 15, 2006 from http://www.teknic.com/systems/.
MK5 Electronics Top 10 Application Features, 2005 Spring Update, 10 pgs.
Infineon Technologies, "XC164CS 16-Bit Single-Chip Microcontroller", Data Sheet, V2.1, Jun. 2003, 71 pgs.
Int'l App. No. PCT/US06/33963, International Search Report, mailed May 4, 2007, 3 pages.
Int'l App. No. PCT/US06/33963, Written Opinion of the International Searching Authority, mailed May 4, 2007, 6 pages.
Int'l App. No. PCT/US06/33964, International Search Report, mailed May 4, 2007, 3 pages.
Int'l App. No. PCT/US06/33964, Written Opinion of the International Searching Authority, mailed May 4, 2007, 10 pages.
Int'l App. No. PCT/US06/33971, International Search Report, mailed Mar. 9, 2007, 4 pages.
Int'l App. No. PCT/US06/33971, Written Opinion of the International Searching Authority, mailed Mar. 9, 2007, 6 pages.
Int'l App. No. PCT/US06/33978, International Search Report, mailed Jun. 5, 2007, 7 pages.
Int'l App. No. PCT/US06/33978, Invitation to Pay Additional Fees and Communication Relating to the Results of the Partial International Search, mailed Apr. 5, 2007, 8 pages.
Int'l App. No. PCT/US06/33978, Written Opinion of the International Searching Authority, mailed Jun. 5, 2007, 8 pages.
Int'l App. No. PCT/US06/34149, International Search Report, mailed Jun. 8, 2007, 3 pages.
Int'l App. No. PCT/US06/34149, Written Opinion of the International Searching Authority, mailed Jun. 8, 2007, 7 pages.
Invacare, Owner's Operator and Maintenance Manual, Formula, CG Powered Seating Tilt Only, 48 pgs., Part No. 1143155, dated Jun. 30, 2006.
Quantum Rehab Innovative Rehab Solutions, a division of Pride Mobility Products Group, Q controls, page from http://www.pridemobility.com/quantum/Electronics/Q_Controls/q_controls.html, printed Jun. 9, 2006, copyright 1995-2006.
U.S. Appl. No. 11/511,606, Final Office Action, 5 pages, mailed Jun. 7, 2007.
U.S. Appl. No. 11/511,606, Non-final Office Action, 4 pages, mailed Dec. 21, 2006.
U.S. Appl. No. 11/511,606, Non-final Office Action, 5 pages, mailed Sep. 13, 2007.
PCT/US2006/033973, PCT International Search Report, mailed Mar. 16, 2007.
PCT/US2006/033973, PCT Written Opinion of the International Searching Authority, mailed Mar. 16, 2007.
U.S. Appl. No. 11/511,606, Notice of Allowance and Fees Due with Notice of Allowability, 5 pages, mailed May 8, 2008.
U.S. Appl. No. 11/513,746, Non-final Office Action, 7 pages, mailed Jun. 26, 2008.
Response to Office action from U.S. Appl. No. 11/511,606 dated Jan. 8, 2008.
Response to Office action from U.S. Appl. No. 11/511,606 dated Aug. 24, 2007.
Response to Office action from U.S. Appl. No. 11/511,606 submitted Mar. 21, 2007.
Response to Office action from U.S. Appl. No. 11/513,746 dated Oct. 27, 2008.
Office action from U.S. Appl. No. 11/513,746 dated Jan. 15, 2009.
Office action from U.S. Appl. No. 11/513,802 dated Aug. 7, 2009.
Office action from U.S. Appl. No. 11/513,750 dated Nov. 23, 2009.
Response from U.S. Appl. No. 11/513,740 dated Feb. 4, 2011.
Comments on Statement of Reasons for Allowance from U.S. Appl. No. 11/514,016 dated Oct. 29, 2010.
Notice of Allowance from U.S. Appl. No. 11/514,016 dated Jan. 19, 2011.
Office action from U.S. Appl. No. 11/513,780 dated Jan. 27, 2011.
Response from U.S. Appl. No. 11/513,802 dated Feb. 4, 2011.
Notice of Allowance from U.S. Appl. No. 11/513,750 dated Jan. 20, 2011.
Office action from New Zealand Application No. 565,929 dated Oct. 8, 2009.
Response from New Zealand Application No. 565,929 dated Mar. 7, 2011.
Office action from New Zealand Application No. 565,929 dated Mar. 25, 2011.
Office action from New Zealand Application No. 565,930 dated Mar. 10, 2011.
Office action from New Zealand Application No. 565,931 dated Oct. 8, 2009.
Response from New Zealand Application No. 565,931 dated Mar. 7, 2011.
Office action from New Zealand Application No. 565,931 dated Mar. 25, 2011.
Office action from New Zealand Application No. 565,932 dated Oct. 12, 2009.
Response from New Zealand Application No. 565,932 dated Mar. 21, 2011.
Office action from New Zealand Application No. 565,933 dated Sep. 28, 2009.
Response from New Zealand Application No. 565,933 dated Feb. 16, 2011.
Office action from New Zealand Application No. 565,934 dated Oct. 12, 2009.
Response from New Zealand Application No. 565,934 dated Mar. 7, 2011.
Office action from New Zealand Application No. 565,934 dated Mar. 28, 2011.
Response from New Zealand Application No. 565,935 dated Feb. 4, 2011.
Office action from New Zealand Application No. 565,935 dated Feb. 18, 2011.
Office action from New Zealand Application No. 565,930 dated Oct. 7, 2009.
Response from New Zealand Application No. 565,930 dated Feb. 22, 2011.
Office action from New Zealand Application No. 565,932 dated Mar. 29, 2011.
Office action from New Zealand Application No. 565,933 dated Feb. 28, 2011.
Response from New Zealand Application No. 565,933 dated Apr. 18, 2011.
Office action from New Zealand Application No. 565,935 dated Oct. 5, 2009.
Response from New Zealand Application No. 565,935 dated Apr. 15, 2011.
Office action from U.S. Appl. No. 11/513,740 dated Feb. 4, 2010.
Response from U.S. Appl. No. 11/513,740 dated Jul. 6, 2010.
Office action from U.S. Appl. No. 11/514,016 dated Feb. 22, 2010.
Response from U.S. Appl. No. 11/514,016, filed Jul. 21, 2010.
Response from U.S. Appl. No. 11/513,802 dated Aug. 10, 2010.
Response from U.S. Appl. No. 11/513,802 dated Dec. 3, 2009.
Response from U.S. Appl. No. 11/513,802 dated Mar. 19, 2010.
Response from U.S. Appl. No. 11/513,750 dated May 21, 2010.
Asakawa et al., "Experiment on operating methods of an electric wheelchair for a system of detecting position and direction", Robotics and Biomimetics, ROBIO 2007, IEEE Int'l Conf on Digital Object Identifier, 10.1109/ROBIO.2007.4522345, pp. 1260-1265 (2007).
Barea, R., et al., "EOG guidance of a wheelchair using nerual networks", Proceedings 15th Intl Conf. on Pattern Recognition, vol. 4, Digital Object Identifier 10.1109/ICPR.2000.903006, pp. 668-671, published 2000.
Cooper et al., "Analysis of position and isometric joysticks for powered wheelchair driving", Biomedical Engineering, IEEE Transactions on Digital Object Identifier, vol. 47, issue 7, 10.1109/10.846684, published 2000, pp. 902-910.
Jones et al., "Powered wheelchair driving performance using force- and position-sensing joysticks", Bioengineering Conference, Proceedings of the IEEE 24th Annual Northeast, Digital Object identifier, 10.1109/NEBC.1998.664901, pp. 130-132, published 1998.
Katsura et al., "Semiautonomous wheelchair based on quarry of environmental information", IEEE Translations on Industrial Electronics, vol. 52, issue 4, Digital Object Identifier 10.1109/TIE.2006.878294, pp. 1373-1382, published 2006.

Sasaki et al., "Development of a new adaptation system for a manual wheelchair based on human body function", MHS '07 International Symposium on Micro-NanoMechatronics and Human Science, Digital Object Identifier, 10.1109/MHS.2007.4420902, pp. 478-484, published 2007.

Seong-Pal Kang, "A hand gesture controlled semi-autonomous wheelchair", IEEE/RSJ Intl Conf on Intelligent Robots and Systems, Digital Object Identifier: 10.1109/IROS.2004.1389968, pp. 3565-3570, vol. 4, published 2004.

Tanimoto et al., "Measurement of wheelchair position for analyzing transfer motion for SCI patient", Imaging Systems and Techniques, IST '07, IEEE International Workshop on Digital Object Identifier, 10.1009/IST.2007.379605, pp. 1-6, published 2007.

Office action from U.S. Appl. No. 11/513,740 dated Oct. 4, 2010.

Notice of Allowance from U.S. Appl. No. 11/514,016 dated Sep. 30, 2010.

Office action from U.S. Appl. No. 11/512,802 dated Oct. 6, 2010.

Notce of Allowance fom U.S. Appl. No. 11/513,750 dated Dec. 2, 2010.

Response from New Zealand Application No. 565,932 dated May 13, 2011.

Response from New Zealand Application No. 565,934 dated May 13, 2011.

Office action from U.S. Appl. No. 12/064,697 dated Jun. 22, 2011.

Office action from U.S. Appl. No. 11/513,740 dated Apr. 21, 2011.

Response from U.S. Appl. No. 11/513,740 dated Jul. 21, 2011.

Office action from U.S. Appl. No. 11/513,802 dated Apr. 14, 2011.

Response from U.S. Appl. No. 11/513,802 dated Jul. 14, 2011.

Notice of Allowance from U.S. Appl. No. 11/513,802 dated Aug. 25, 2011.

Response from U.S. Appl. No. 11/513,780 dated Apr. 27, 2011.

Office action from U.S. Appl. No. 11/513,780 dated Aug. 2, 2011.

Notice of Allowance from U.S. Appl. No. 11/514,016 dated May 5, 2011.

Office action from Australian Application No. 2006284687 dated Jul. 26, 2011.

Office action from Australian Application No. 2006284747 dated Jul. 1, 2011.

Office action from Australian Application No. 2006284749 dated Apr. 28, 2011.

Office action from Australian Application No. 2006284741 dated May 9, 2011.

Office action from Australian Application No. 2006284753 dated Jul. 22, 2011.

Response from New Zealand Application No. 565,931 dated May 4, 2011.

Office action from New Zealand Application No. 591,829 dated Mar. 28, 2011.

Office action from New Zealand Application No. 592,271 dated Apr. 20, 2011.

Office action from New Zealand Application No. 591,831 dated Mar. 28, 2011.

Office action from New Zealand Application No. 592,317 dated Apr. 21, 2011.

Response from New Zealand Application No. 565,935 dated Apr. 15, 2011.

Response from New Zealand Application No. 565,930 dated May 5, 2011.

Office action from New Zealand Application No. 565,930 dated May 26, 2011.

Response from New Zealand Application No. 565,930 dated Jun. 24, 2011.

Response from New Zealand Application No. 565,929 dated May 11, 2011.

Notice of Allowance from U.S. Appl. No. 11/513,750 dated May 5, 2011.

Response from U.S. Appl. No. 11/514,016 dated Aug. 4, 2011.

* cited by examiner

CONTEXT-SENSITIVE HELP FOR DISPLAY DEVICE ASSOCIATED WITH POWER DRIVEN WHEELCHAIR

CROSS-REFERENCE TO RELATED APPLICATIONS

This application claims the benefit of seven U.S. provisional patent applications, including Ser. No. 60/712,987, filed Aug. 31, 2005, Ser. No. 60/727,005, filed Oct. 15, 2005, Ser. No. 60/726,983, filed Oct. 15, 2005, Ser. No. 60/726,666, filed Oct. 15, 2005, Ser. No. 60/726,981, filed Oct. 15, 2005, Ser. No. 60/727,249, filed Oct. 15, 2005, and Ser. No. 60/727,250, filed Oct. 15, 2005. This application is also related to seven co-pending U.S. utility patent applications filed the same day as this application, including Ser. No. 60/727,005 entitled "Mode Programmable Actuator Controller for Power Positioning Seat or Leg Support of a Wheelchair," Ser. 60/726,983 entitled "Method and Apparatus for Setting or Modifying Programmable Parameter in Power Driven Wheelchair," Ser. No. 60/726,981 entitled "Method and Apparatus for Programming Parameters of a Power Driven Wheelchair for a Plurality of Drive Settings," Ser. No. 60/727,249 entitled "Method and Apparatus for Automated Positioning of User Support Surfaces in Power Driven Wheelchair," Ser. No. 60/727,250 entitled "Power Driven Wheelchair," and application Ser. No. 11/513,750 entitled "Method and Apparatus for Improved Support of Power Driven Wheelchair." The contents of all above-identified patent application(s) and patent(s) are fully incorporated herein by reference.

BACKGROUND

Power driven wheelchairs generally include right and left drive wheels driven by a motor controller via corresponding right and left drive motors. A power driven wheelchair may also include actuators, motors, or other devices to control user support surfaces, such as seats, backs, leg rests, foot rests, or head rests. These various actuators, motors, and other devices may be controlled via a user interface. The user interface may include input devices, such as a joystick, pushbuttons and other types of switches, potentiometers and other types of control devices, and output devices, such as a graphic display, alphanumeric display, or indicators. Input devices for special needs users, such as a proportional head control, a sip n' puff system, a fiber optic tray array, a proximity head array, or a proximity switch array, may also be provided as a user interface or as a remote input to the user interface.

Examples of power driven wheelchairs are provided in a product brochure entitled "Invacare® Storm® Series TDX™ Power Wheelchairs, including Formula™ Powered Seating," Form No. 03-018, 2004 from Invacare Corporation of Elyria, Ohio, the contents of which are fully incorporated herein by reference. Additional examples of power driven wheelchairs are provided in another product brochure entitled "Invacare® Tarsys® Series Powered Seating System," Form No. 00-313, 2002 from Invacare Corporation, the contents of which are fully incorporated herein by reference.

Currently, a separate remote programmer unit may be used to set or modify programmable parameters associated with operation of a given power driven wheelchair. Examples of remote programmers and their use in conjunction with a power driven wheelchair are provided in U.S. Pat. No. 6,871,122 to Wakefield, II and U.S. Pat. No. 6,819,981 to Wakefield, II et al., both assigned to Invacare Corporation. The contents of both of these patents are fully incorporated herein by reference.

SUMMARY

In one aspect, an apparatus associated with a power driven wheelchair is provided. In one embodiment, the apparatus includes: a display device to selectively display screen content during operation or support of the power driven wheelchair, a first input device for selective activation, and a microcontroller in operative communication with the display device and the first input device. In this embodiment, the microcontroller controls the content displayed on the display device during the operation or support and detects activation of the first input device. Additionally, in response to detection of the first input device activation, the microcontroller selects help information content from a collection of help information, the selected help information content being contextually related to the screen content displayed on the display device. The microcontroller also controls display of the contextually-related help information content on the display device.

In another aspect, a method for providing help information on a display device associated with a power driven wheelchair is provided. In one embodiment, the method includes: a) displaying content on the display device during operation or support of the power driven wheelchair, b) detecting selective activation of a first input device, c) in response to detection of the first input device activation, selecting help information content from a collection of help information, the selected help information content being contextually related to the content displayed on the display device, and d) displaying the contextually-related help information content on the display device.

In another embodiment, the method includes: a) displaying content on the display device during operation or support of the power driven wheelchair, the content during at least a portion of the operation or support including one or more screen objects, b) detecting activation of a screen navigation control, c) in response to detection of the screen navigation control activation, designating a first screen object from the one or more screen objects as active within the content, d) detecting selective activation of a help switch, e) in response to detection of the help switch activation, selecting help information content from a collection of help information, the selected help information content being contextually related to the first screen object within the content displayed on the display device, and f) displaying the contextually-related help information content on the display device.

BRIEF DESCRIPTION OF THE DRAWINGS

These and other features, aspects, and advantages of the present invention will become better understood with regard to the accompanying drawings, following description, and appended claims.

DETAILED DESCRIPTION

Figure 1:
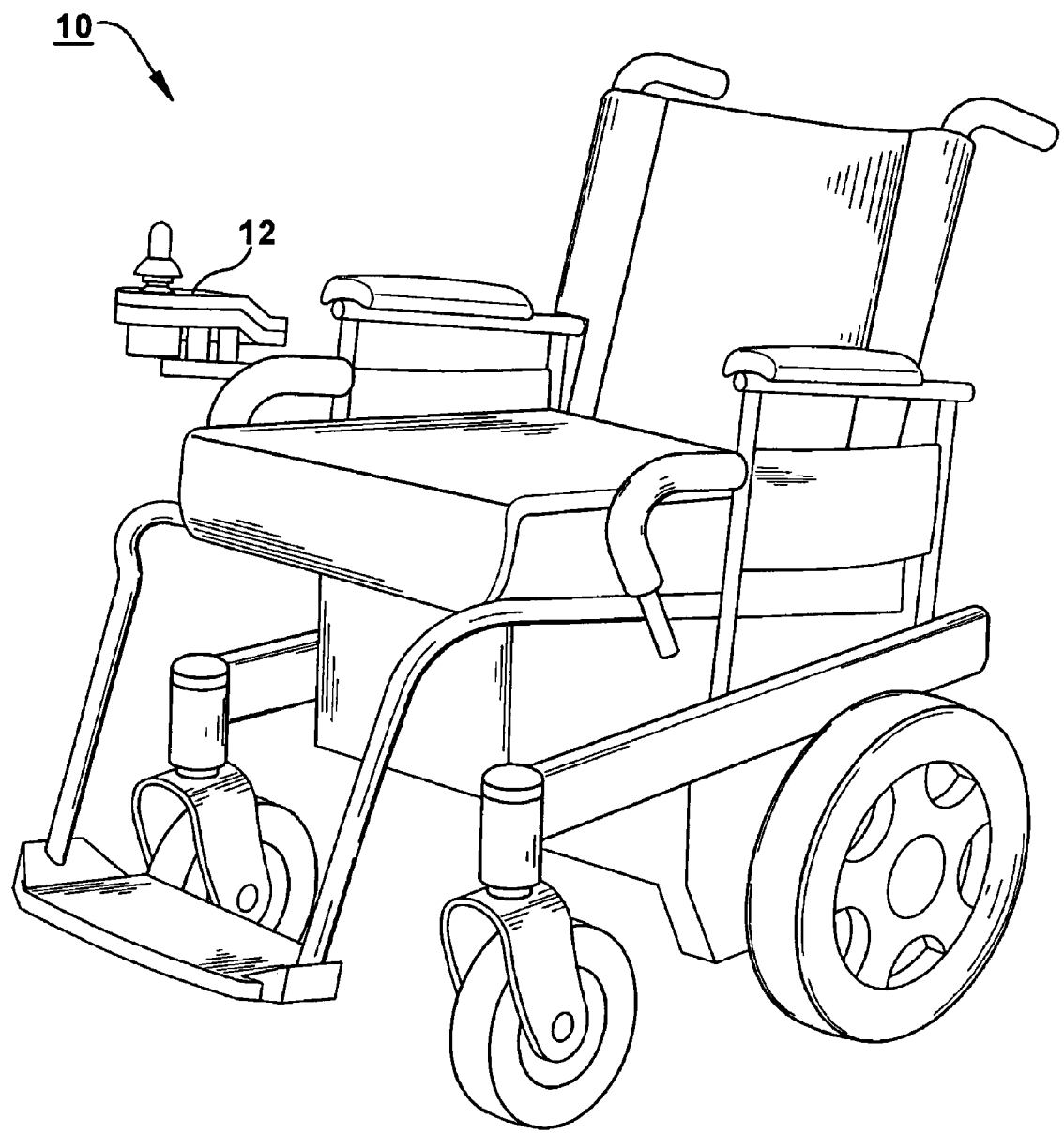
FIG. 1 shows an exemplary embodiment of a power driven wheelchair.

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more enumerated elements or method steps.

"Context-sensitive help," as used herein includes, but is not limited to, a form of assistance in a system with a display in which a program that controls the display provides on-screen information to the user concerning the current command or operation being attempted, a type of assistance built into software that displays information related to the particular function in use, or a software feature that provides information related to the specific program, command or dialog box that is open or currently displayed. For example, if the content of a display screen includes one or more screen objects, information about an active or currently selected screen object is provided when context-sensitive help is requested.

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. As used herein, "logic" is considered synonymous with "circuit."

"Operative communication," as used herein includes, but is not limited to, a communicative relationship between devices, logic, or circuits, including mechanical and pneumatic relationships. Direct electrical, electromagnetic, and optical connections and indirect electrical, electromagnetic, and optical connections are examples of such communications. Linkages, gears, chains, push rods, cams, keys, attaching hardware, and other components facilitating mechanical connections are also examples of such communications. Pneumatic devices and interconnecting pneumatic tubing may also contribute to operative communications. Two devices are in operative communication if an action from one causes an effect in the other, regardless of whether the action is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or" is used to describe a list of alternative things in which one may choose one option or any combination of alternative options. For example, "A or B" means "A or B or both" and "A, B, or C" means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combination of alternatives are not included in the choices associated with the list.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

With reference to FIG. 1, an exemplary embodiment of a power driven wheelchair 10 may include a system controller 12. The system controller 12 may control operation or support of the power driven wheelchair 10. Other embodiments of power driven wheelchairs and other embodiments of system controllers are available in various combinations.

Figure 2:
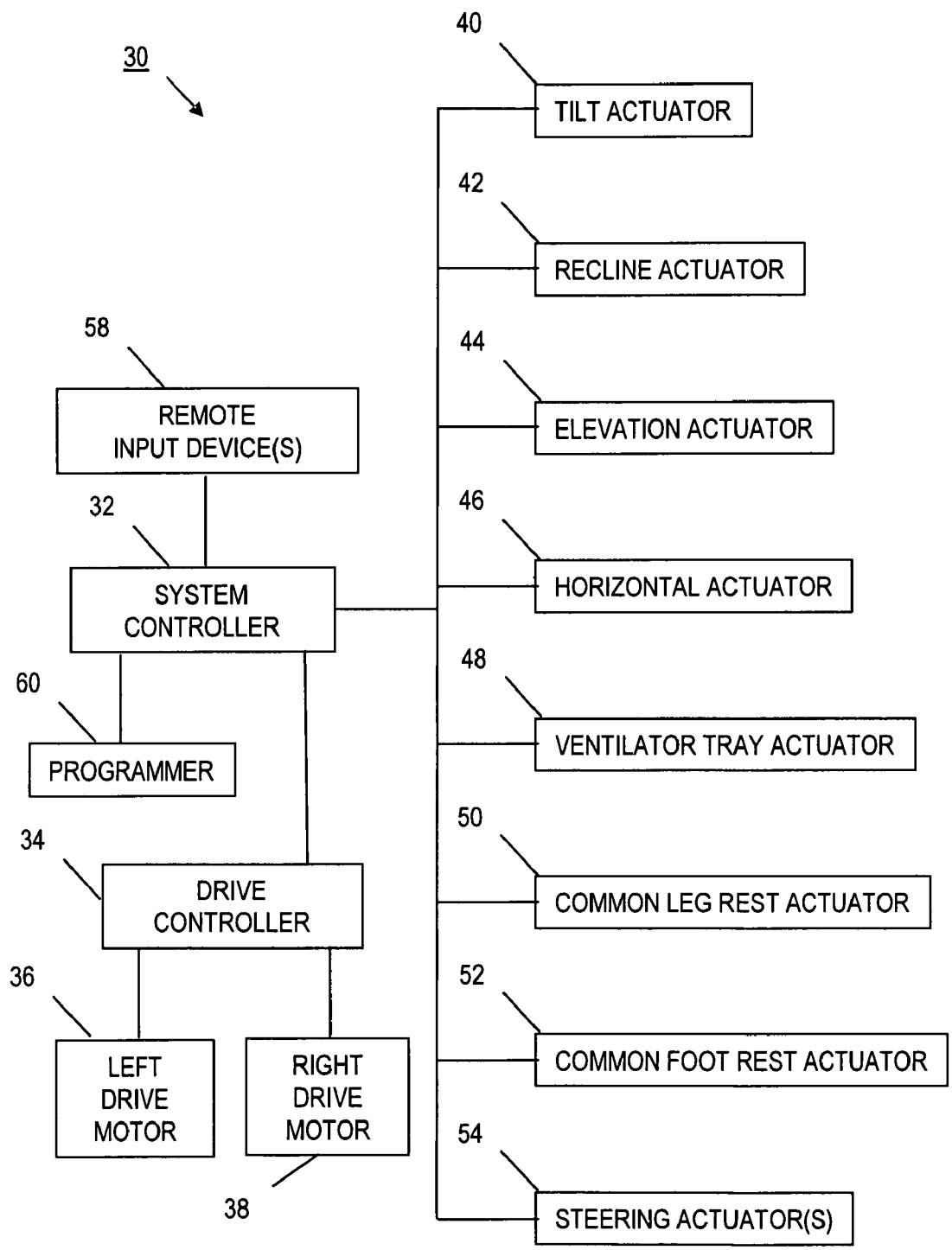
FIG. 2 is a block diagram of an exemplary embodiment of a power driven wheelchair.

With reference to FIG. 2, an exemplary embodiment of a power driven wheelchair 30 is depicted in block diagram fashion. As shown, the power driven wheelchair 30 may include a system controller 32, a drive controller 34, a left drive motor 36, a right drive motor 38, and a suitable power source (e.g., battery) (not shown). The system controller 32 may include a user interface and may control the drive controller 34 in response to activation of one or more input devices associated with the user interface and in response to software programs for one or more operating or support modes. The software programs may use a plurality of programmable parameters arranged in sets associated with, for example, different environmental conditions to define driving response characteristics. The drive controller 34 may control the left and right drive motors 36, 38 in response to commands from the system controller 32. Communication between the system controller 32 and drive controller 34 may be via serial or parallel bus connections or via discrete signal connections. For example, a Shark serial communication bus, developed by Dynamic Controls of New Zealand, may be used to communicate with the drive controller 34. In another embodiment, the system controller 34 may communicate directly with a left drive motor and a right drive motor via a serial communication bus, such as a controller area network (CAN) bus, where the left and right drive motors include a serial bus interface and local intelligence.

The power driven wheelchair 30 may also include various options, such as powered seating, powered front rigging, and powered steering. In one embodiment, the powered seating option may include a tilt actuator 40, a recline actuator 42, an elevation actuator 44, a horizontal actuator 46, and a ventilator tray actuator 48. In one embodiment, the powered front rigging option may include a common leg rest actuator 50 and a common foot rest actuator 52. In another embodiment, the powered front rigging option may include independent left and right leg rest actuators and independent left and right foot rest actuators. In one embodiment, the powered steering option may include one or more powered steering actuators 54. These options may be added to the wheelchair in any combination. Likewise, various combinations of actuators may be selected for each option. For example, a powered seating option may be limited to tilt and recline actuators 40, 42, tilt and elevation actuators 40, 44, recline and elevation actuators 40, 46, or tilt, recline, and elevation actuators 40, 42, 44. If the power driven wheelchair has split left and right leg rests, individual right and left leg rest actuators may be provided in lieu of the common leg rest actuator 50. Back and seat shear reduction, for example, may be provided by coordinated movement of the recline and horizontal actuators 42, 46. The system controller 32 may control the actuators in response to activation of one or more input devices associated with the user interface and in response to software programs for one or more operating or support modes. The software programs may use a plurality of programmable parameters, for example, to define desired positions for user support surfaces and actuator response characteristics. Communication between the system controller 32 and actuators may be via serial or parallel bus connections or via discrete signal connections. For example, in one embodiment, actuators may include sensors and local electronics which provides an interface to a CAN bus. It is understood that any actuator may include a variable speed reversible motor, a stepper motor, a linear motor, a servo motor, or another suitable device associated with position control of an actuator mechanism. The actuator mechanism, for example, controlling the position of user support surfaces, such as seat, back, leg rest, foot rest, or head rest support surfaces, via a suitable linkage, drive train, coupling, or another type of mechanical interface.

In one embodiment, providing modularization of actuators, motors, and other output devices with sensors, detectors, or other devices providing feedback for closed loop control of the corresponding output device facilitates the use of a serial or parallel bus architecture in the power driven wheelchair 30. This also simplifies the addition or removal of optional output devices and streamlines upgrades and retrofits. Moreover, distributing intelligence, including interface circuits for output devices and associated feedback components, from the centralized controller to the modular output devices further improves performance through parallel processing. In additional embodiments, distributing additional intelligence, including closed-loop control algorithms, from the centralized controller to the modular output devices further improves performance through additional parallel processing and reduced bus traffic.

One or more remote input devices 58 may also be provided as options in the power driven wheelchair 30. For example, user interfaces for special needs users, such as a proportional head control, a sip n' puff system, a fiber optic tray array, a proximity head array, or a proximity switch array, may be provided as a remote input to the system controller 32. Additional examples of remote input devices 58 include, a 4-way toggle switch assembly, a quad pushbutton assembly, and a compact proportional joystick assembly. The 4-way toggle switch assembly or the quad pushbutton assembly, for example, may be used for controlling powered seating systems. The compact proportional joystick assembly, for example, may be used as a proportional attendant control. Communication between the system controller 32 and the remote input device(s) 58 may be via serial or parallel bus connections or via discrete signal connections. For example, a remote input device may be connected to a serial port on the system controller 32. If the remote input device includes the appropriate electronics and local intelligence (e.g., processes for composing and de-composing bus messages), communications with the system controller 32 may, for example, be via a CAN bus or another type of bus or network connection.

A programmer 60 may be used in conjunction with the power driven wheelchair 30. The programmer 60 described herein may be an optional accessory or special tool for dealers or technicians. The programmer 60 may be adapted for use on various models and configurations of power driven wheelchairs. Communication between the system controller 32 and the programmer 60 may be via serial or parallel bus connections or via discrete signal connections. For example, the programmer 60 may be connected to a serial port on the system controller 32. If the programmer 60 includes the appropriate electronics and local intelligence (e.g., processes for composing and de-composing bus messages), communications with the system controller 32 may, for example, be via a CAN bus or another type of bus or network connection. The various aspects of FIG. 2 described above may be automated, semi-automated, or manual and may be implemented through hardware, software, firmware, or combinations thereof.

Figure 3:
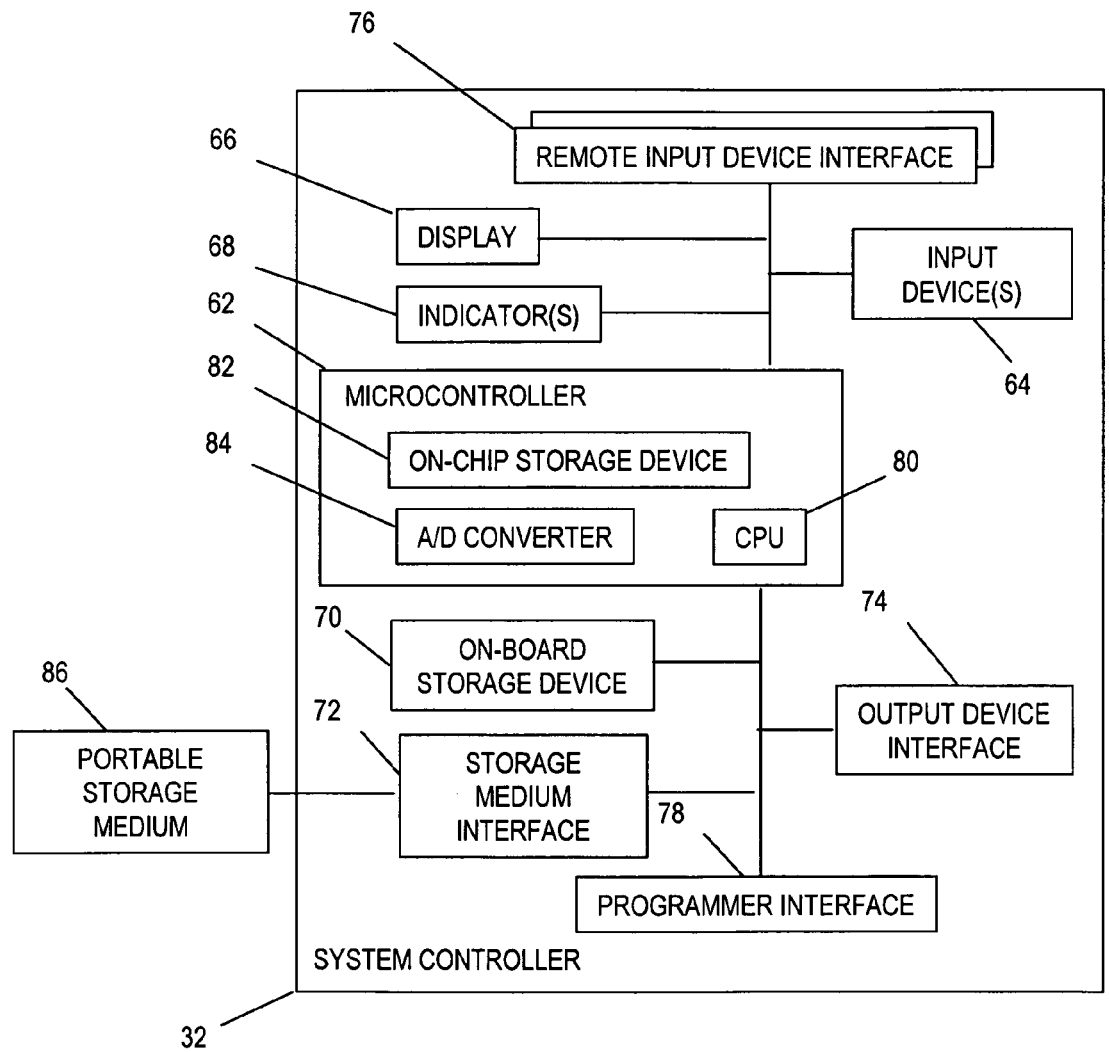
FIG. 3 is a block diagram of an exemplary embodiment of a system controller for a power driven wheelchair.

With reference to FIG. 3, a block diagram of an exemplary embodiment of a system controller 32 may include a microcontroller 62, one or more input devices 64, a display 66, one or more indicators 68, an on-board storage device 70, a storage medium interface 72, an output device interface 74, one or more remote input device interfaces 76, and a programmer interface 78. The microcontroller 62 may include a central processing unit (CPU) 80, an on-chip storage device 82, and an analog-to-digital (A/D) converter 84. The A/D converter 84 may provide the microcontroller 62 with an interface to receive analog input signals. In one embodiment, the microcontroller 62 may include an SAF-XC164CS 16-bit single-chip microcontroller by Infineon Technologies of München, Germany.

The display 66, for example, may include a 128×64 pixel graphic display or a 160×160 pixel graphic display. In additional embodiments, the display may include a graphic display in a different size or a different arrangement of pixels. Any type of graphic display may be used, such as a liquid crystal display (LCD). Additionally, an alphanumeric display or another type of display may be used. The one or more indicators 68, for example, may include light emitting diodes (LEDs), lamps, other types of visual indicators, or audible devices. The one or more input devices 64, for example, may include a proportional analog joystick, a three position toggle or rotary switch, a return-to-center momentary three position switch, a rotary potentiometer, and a plurality of momentary pushbuttons. In additional embodiments, the one or more input devices 64, may include other types of joysticks, switches, potentiometers, pushbuttons, or other types of control devices.

The output device interface 74 may be connected, for example, to a motor controller, actuators, motors, or similar devices associated with the power driven wheelchair. The output device interface 74 may include one or more serial ports, one or more serial portion, or discrete wiring connections in any combination. For example, the output device interface 74 may include a CAN bus serial port and a Shark bus serial port. The one or more remote input device interfaces 76 and programmer interface 78 may each include a serial port, parallel port, or discrete wiring connections.

The microcontroller 62 may receive input signals from the one or more input devices 64, remote input devices 58 (FIG. 2) connected to the one or more remote input device interfaces 76, or a programmer 60 (FIG. 2) connected to the programmer interface 78. The microcontroller 62 may control the display 66, the one or more indicators 68, and various motors, actuators, and other output devices connected to the output device interface 74, at least in part, in response to the input signals from the one or more input devices 64, remote input devices 58 (FIG. 2), or programmer 60 (FIG. 2).

The on-board storage device 70 and on-chip storage device 82 each may include a volatile storage device, such as random access memory (RAM), and a non-volatile storage device, such as non-volatile memory, a fixed disk device, a removable disc device, an optical storage device, etc. Non-volatile memory, for example, may include read-only memory (ROM), programmable read-only memory (PROM), erasable programmable read-only memory (EPROM), electrically erasable programmable read only memory (EEPROM), or flash memory. For example, software programs, one or more programmable parameter sets, and help information may be stored in one or more non-volatile memory storage devices associated with the on-board storage device 70 or on-chip storage device 82. Each programmable parameter set may include a plurality of programmable operating parameters for the power driven wheelchair 20. The microcontroller 62 may run the software programs and may control the display 66, indicators 68, and various motors, actuators, and other output devices connected to the output device interface 74 based, at least in part, on one or more of the programmable operating parameters.

A portable storage medium 86 may be used in conjunction with the system controller 32. The portable storage medium 86 may include a plurality of storage locations which may store a security key, one or more library parameter sets, and a collection of help information The portable storage medium 86 described herein may be an optional accessory or special tool for dealers or technicians. In some cases, the portable storage medium 86 may also be used in conjunction with normal operation of the power driven wheelchair by its owner or end user. The portable storage medium 86 described herein may be suitable for use on various models and configurations of power driven wheelchairs. However, in another scheme for protection and security of the information stored therein, a given portable storage medium 86 may be serialized or otherwise tailored and keyed to an individual system controller 32 and corresponding power driven wheelchair. Communication between the microcontroller 62 and the portable storage medium 86 may be via the storage medium interface 72.

The portable storage medium 86 may include a non-volatile storage medium, such as non-volatile memory. In one embodiment, the portable storage medium 86 may include, for example, a type of removable storage medium known as a removable memory card. For example, the portable storage medium 86 may include a secure digital (SD) card. In the embodiment being described, the storage medium interface 72 may include, for example, a corresponding removable memory interface (e.g., an SD card reader) to communicate and exchange information with the microcontroller 62.

In additional embodiments, the portable storage medium may include other types of removable memory, such as a compact flash (CF) card, a flash memory pen drive, a memory stick, a microdrive, a multimedia memory card (MMC), a smart media (SM) card, an xD picture card, a subscriber identity module (SIM) card, a memory chip (e.g., ROM, PROM, EPROM, EEPROM), or another suitable form of removable, separable, or detachable memory. In other additional embodiments, the portable storage medium may include other forms of removable storage medium, such as optical discs (e.g., compact discs (CDs), digital video discs (DVDs)) or floppy disks (e.g., zip disks).

In still further embodiments, the portable storage medium may include a portable storage device, such as an external memory card reader, an external optical disc drive, an external floppy disk drive, a portable computer (e.g., laptops, notebooks, personal digital assistants (PDAs)), a mobile telephone (e.g., cellular telephone, personal communication system, satellite telephone), a digital camera, an MP3 player, or any type of portable storage device capable of wired or wireless communication with another compatible communication device.

The storage medium interface 72, for example, may include a connector or socket that mates with the portable storage medium 86 and an electronic circuit that supports communication between the microcontroller 62 and the portable storage medium 86. For example, the storage medium interface 72 may include a memory card reader, a memory chip socket, an optical disc drive, a floppy disk drive, a serial port (e.g., universal serial bus (USB) port, RS-232), a parallel port (e.g., small computer system interface (SCSI) port), a modem, an Ethernet port, a wireless Ethernet transceiver (e.g., IEEE 802.11b), a Bluetooth transceiver, an infrared (IR) transceiver, a radio frequency (RF) transceiver, a mobile telephone interface, a cable television interface, a satellite television interface, or any communication device capable of wired or wireless communication with a corresponding portable storage medium. The various aspects of FIG. 3 described above may be automated, semi-automated, or manual and may be implemented through hardware, software, firmware, or combinations thereof.

Figure 4:
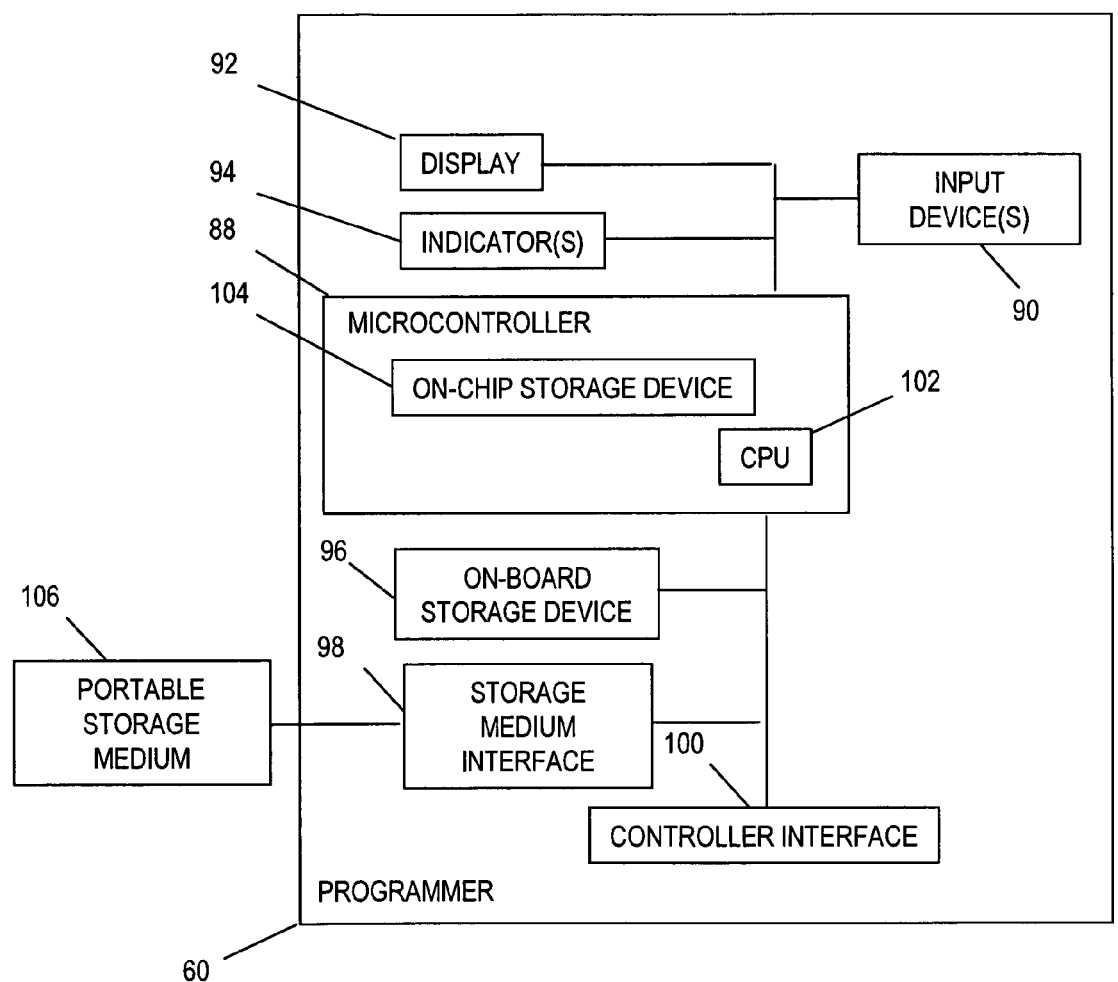
FIG. 4 is a block diagram of an exemplary embodiment of a programmer used in conjunction with related embodiments of power driven wheelchairs.

With reference to FIG. 4, an exemplary embodiment of a programmer 60 may include a microcontroller 88, one or more input devices 90, a display 92, one or more indicators 94, an on-board storage device 96, a storage medium interface 98, and a controller interface 100. The microcontroller 88 may include a CPU 102 and an on-chip storage device 104. In one embodiment, the microcontroller 88 may include an SAF-XC164CS 16-bit single-chip microcontroller by Infineon Technologies of München, Germany.

The display 92, for example, may include a 160×160 pixel graphic display. In additional embodiments, the display may include a graphic display in a different size or a different arrangement of pixels. Any type of graphic display may be used, such as an LCD. Additionally, an alphanumeric display or another type of display may be used. The one or more indicators 94, for example, may include LEDs, lamps, other types of visual indicators, or audible devices. The one or more input devices 90, for example, may include a plurality of momentary pushbuttons. In additional embodiments, the one or more input devices 90, may include other types of pushbuttons or other types of control devices.

The controller interface 100 may include a serial port, parallel port, or discrete wiring connections for interfacing with a system controller 32 (FIG. 2) of a power driven wheelchair. The microcontroller 88 may receive input signals from the one or more input devices 90 and the system controller 32 (FIG. 2) connected to the controller interface 100. The microcontroller 88 may latch or store activations of the one or more input devices 90 or other input signals over time. The microcontroller 88 may control the display 92 and the one or more indicators 94, at least in part, in response to the input signals from the one or more input devices or the system controller 32 (FIG. 2).

The microcontroller 88 may periodically (e.g., every 10 ms) receive a status check message from the system controller 32 (FIG. 2) via the controller interface 100. For example, if an activation of the one or more input devices 90 has occurred since the last status check, the microcontroller 88 may send a response to the status check message via the controller interface 100 that may include information regarding the latched or stored activations from the one or more input devices 90. Once the response is sent, certain latched or stored activations may be cleared. If no activations occurred since the last status check, the microcontroller 88 may send a response to the status check message indicating there is no new data to send. The microcontroller 88, for example, may also receive messages from system controller 32 (FIG. 2) via the controller interface 100 containing information to be displayed on the display 92 or commands regarding control of the display 92.

The on-board storage device 96 and on-chip storage device 104 each may include a volatile storage device, such as RAM, and a non-volatile storage device, such as non-volatile memory, a fixed disk device, a removable disc device, an optical storage device, etc. Non-volatile memory, for example, may include ROM, PROM, EPROM, EEPROM, or flash memory. For example, software programs, a plurality of programmable parameter sets, and help information may be stored in one or more non-volatile memory storage devices associated with the on-board storage device 96 or on-chip storage device 104. The microcontroller 88 may run the software programs and may control the display 92 and indicators 94 based, at least in part, on one or more of the programmable operating parameters.

A portable storage medium 106 may be used in conjunction with the programmer 60. Like the portable storage medium 86 (FIG. 3) associated with the system controller 32 (FIG. 3), the portable storage medium 106 may also be an optional accessory or special tool for dealers or technicians. Therefore, the various characteristics, options, and alternatives described above for the portable storage medium 86 (FIG. 3) and storage medium interface 72 (FIG. 3) also apply to the portable storage medium 106 and storage medium interface 98 in the programmer 60. The microcontroller 88 is in communication with the portable storage medium 106 via the storage medium interface 98. This enables the microcontroller 88 to retrieve data from the portable storage medium 106 and provide it to the system controller 32 (FIG. 2) via the controller interface 100 or to save data received from the system controller 32 (FIG. 2) to the portable storage medium 106.

In one embodiment, the portable storage medium 106 associated with the programmer 60 and the portable storage medium 86 (FIG. 3) associated with the system controller 32 (FIG. 2) may be interchangeable. In other words, the portable storage medium 106 may be used in conjunction with the system controller 32 (FIG. 2) and vice versa. Moreover, this interchangeability may extend to other power driven wheelchairs. In other words, the portable storage medium 86 or 106 associated with the power driven wheelchair 10 (FIG. 1) may be used in system controllers or programmers associated with other power driven wheelchairs. This facilitates development of a master copy of library parameter sets on one or more portable storage medium that can be transported to multiple power driven wheelchairs for selective downloading of library parameter sets. Additionally, programmable parameter sets can be selectively uploaded to the master copy to build or grow the library parameter sets from individual power driven wheelchairs. This is particularly useful after modifying a selected programmable parameter set on a first power driven wheelchair for a first user when a second user with a similar power driven wheelchair and similar physical impairments is identified. The various aspects of FIG. 4 described above may be automated, semi-automated, or manual and may be implemented through hardware, software, firmware, or combinations thereof.

Figure 5:
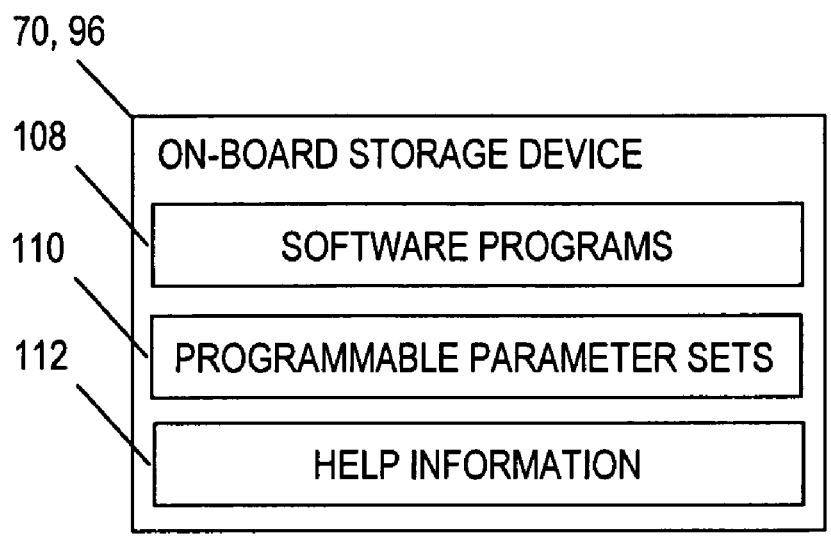
FIG. 5 is a block diagram of an exemplary embodiment of an on-board storage device associated with a system controller or a programmer.

With reference to FIG. 5, an exemplary embodiment of on-board storage device 70, 96 may include a plurality of storage locations that may store software programs 108, one or more programmable parameter sets 110, or a collection of help information 112. In one embodiment, for example, the on-board storage device 70, 96 may include four programmable parameter sets 110. However, there may be more or less programmable parameter sets in additional embodiments. Each programmable parameter set may include multiple programmable operating parameters. The programmable parameter sets may also be viewed as a plurality of programmable operating parameters that may be arranged in sets according to, for example, different environmental conditions for the power driven wheelchair (e.g., indoor, outdoor, etc.).

Figure 6:
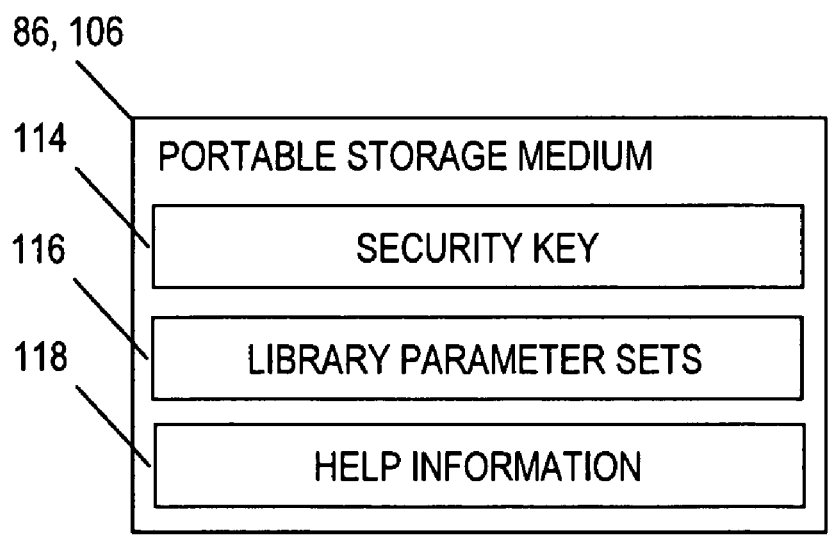
FIG. 6 is a block diagram of an exemplary embodiment of a portable storage medium associated with a system controller or a programmer.

With reference to FIG. 6, an exemplary embodiment of portable storage medium 86, 106 may include a plurality of storage locations that may store a security key 114, one or more library parameter sets 116, or a collection of help information 118. In one embodiment, for example, the portable storage medium 86, 106 may include four or more library parameter sets 116. However, there may be more or less library parameter sets in additional embodiments. Each library parameter set may include multiple programmable operating parameters. The library parameter sets may also be viewed as copies of programmable parameter sets on transportable media that are ready for loading into an on-board storage device 70, 96 (FIG. 5) as corresponding programmable parameter sets.

Figure 7:
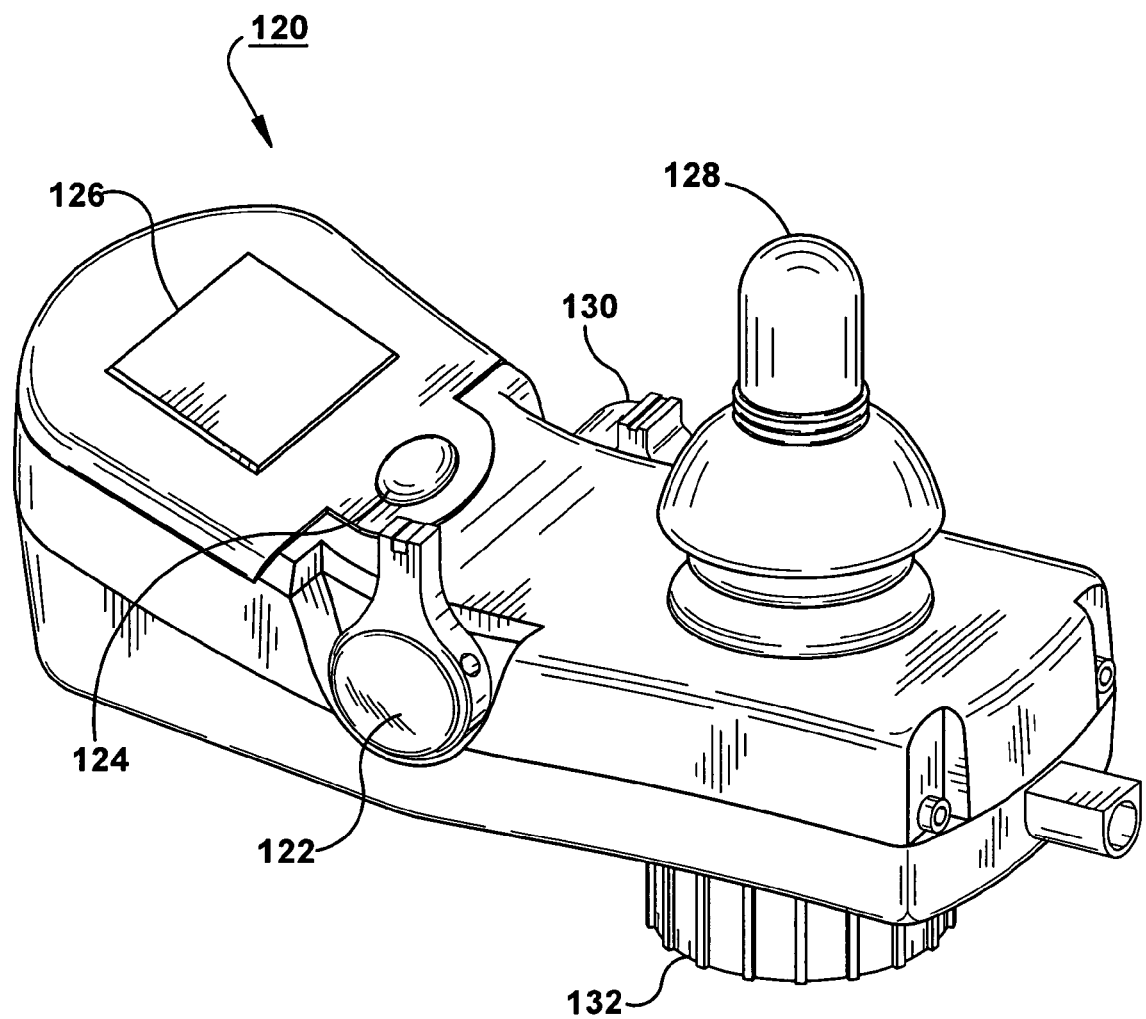
FIGS. 7 through 10 are perspective views of exemplary embodiments of a system controller for a power driven wheelchair.

With reference to FIG. 7, an exemplary embodiment of a system controller 120 may include a power/drive select switch 122, an info switch 124, a graphic display 126, a joystick control 128, a speed control 130, and a mounting hub 132. This configuration of the system controller 120 may be referred to as a multi-purpose joystick (MPJ) model. The MPJ model may also include a removable memory card slot (not shown) for receiving a portable storage medium 86 (FIG. 3), such as a removable memory card.

The power/drive select switch 122, for example, may include a three position rotary switch. The "on" position, for example, is a center position where the power driven wheelchair is powered on. The "drive select" position is a return-to-center position that advances through the available drives (i.e., programmable parameter sets). The "off" position of the power/drive select switch 122 is, for example, a latching position opposite the "drive select" position where the power driven wheelchair is powered down.

The info switch 124, for example, may include a momentary pushbutton switch. Activation of the info switch 124, for example, may cause the controller 120 to access and display help information. Certain information from help information file(s) may be provided on the graphic display 126. The help information provided may be related to the content of the display at or about the time the info switch 124 was activated. For example, information retrieved from help information file(s) may be context-sensitive with respect to an active screen object, such as a current menu or icon selection, a current programmable parameter selection, a current drive selection, a current mode selection, or a current error message. This provides information about a specific item as it is currently being used. The context-sensitive help information may: i) explain current selections for operation or support of the power driven wheelchair, ii) current settings for programmable parameters, iii) current selection(s) with respect to screen objects (i.e., active screen object(s)) of the display, and iv) describe an expected result from activation of the selected or active option. In additional embodiments, retrieval of specific information from the help information file(s) may be menu-driven, topic-driven, or driven by another suitable means.

The graphic display 126, for example, may include a 128× 64 pixel display. A screen on the graphic display 126 may include about five or six lines of text by about 32 characters, about two large icons (e.g., 64×64 pixels icons), about eight small icons (e.g., 32×32 pixel icons), or various combinations thereof. Of course, larger or smaller icons may also be used in various combinations.

The joystick control 128, for example, may include a proportional analog joystick. The joystick control 128, for example, may be used for directional control for menu or icon navigation, setting or modifying a programmable parameter, saving a selected programmable parameter value, directional control for driving the power driven wheelchair, positional control of a selected user support surface, and other selection-type functions when directional or positional control is not required. The joystick control 128 is an example of a screen navigation control. The speed control 130, for example, may include a rotary potentiometer. Turning the speed control 130 between counter-clockwise and clockwise limits adjusts the maximum speed of the power driven wheelchair in relation to operation using the joystick control 128. The mounting hub 132, for example, may be inserted in a mating receptacle on the power driven wheelchair to mount the system controller 32.

Figure 8:
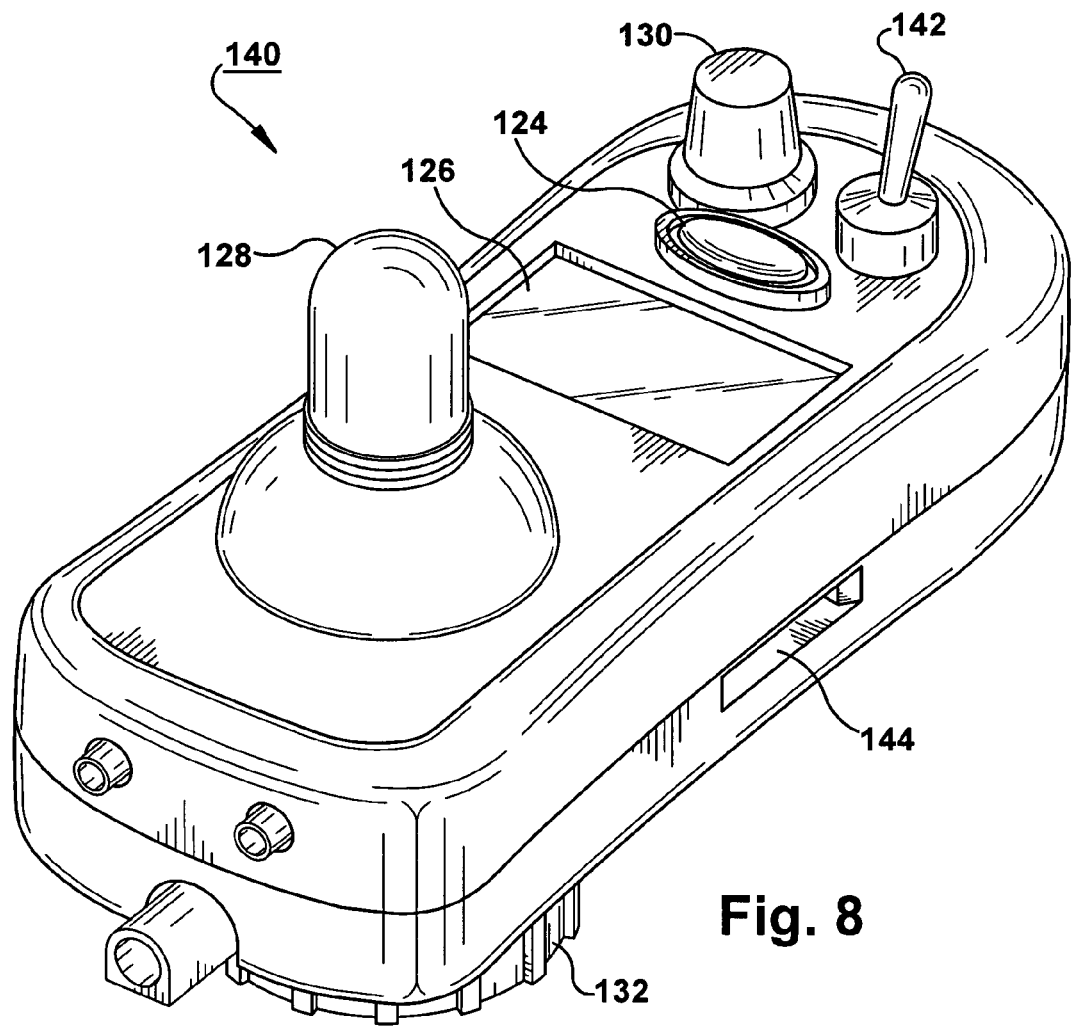

With reference to FIG. 8, another exemplary embodiment of a system controller 140 may include an info switch 124, a graphic display 126, a joystick control 128, a speed control 130, a mounting hub 132, a power/drive select switch 142, and a removable memory card slot 144. This system controller 140 may be referred to as a personalized switch rearmount (PSR) joystick model or simply a PSR model. Generally, the components of the PSR model have the same functional characteristics as the components described above for the MPJ model (FIG. 7). The PSR model provides an alternate construction of a system controller.

Figure 9:
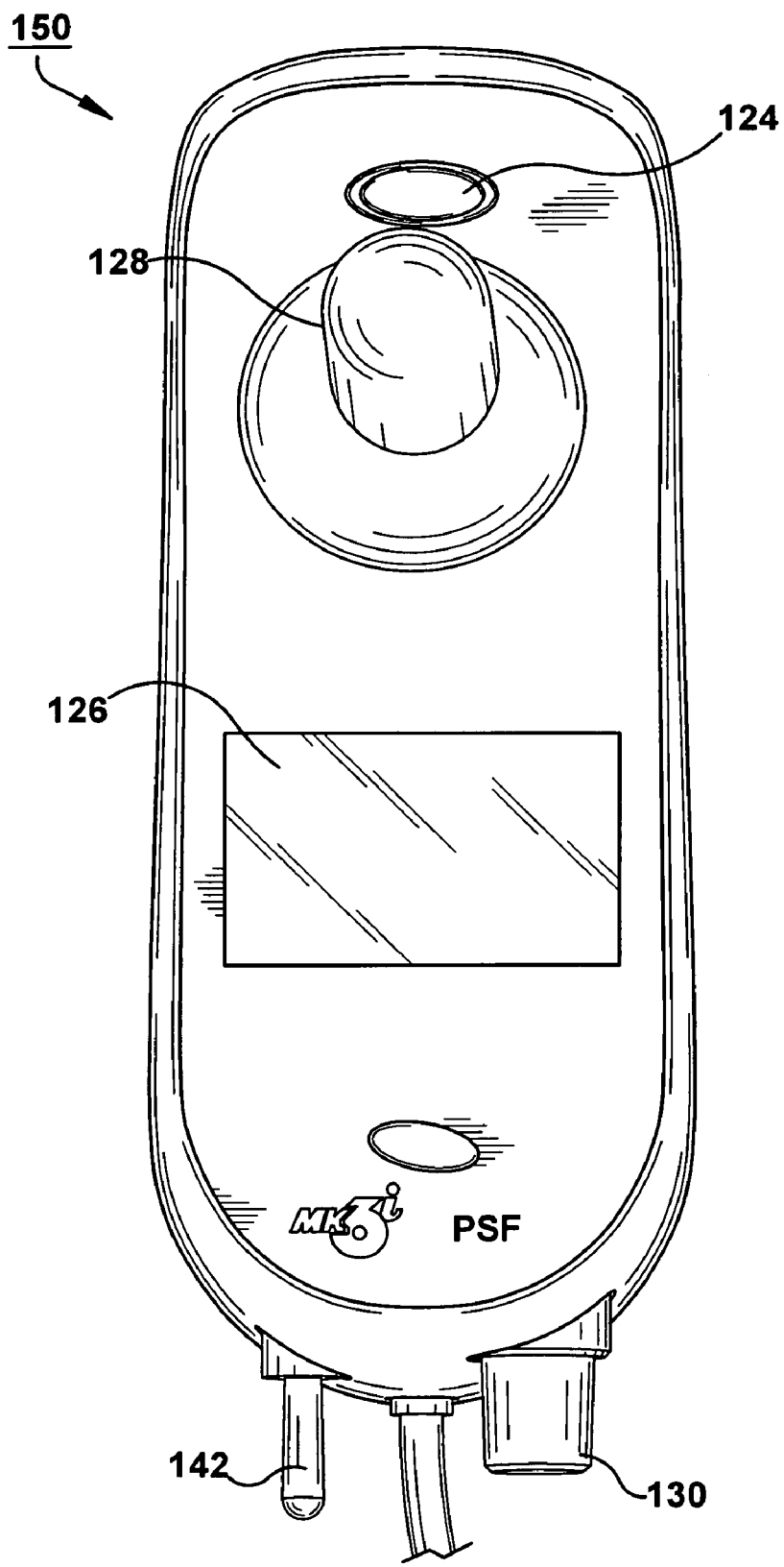

With reference to FIG. 9, still another exemplary embodiment of a system controller 150 may include an info switch 124, a graphic display 126, a joystick control 128, a speed control 130, and a power/drive select switch 142. This system controller 150 may be referred to as a personalized switch front-mount (PSF) joystick model or simply a PSF model. A mounting hub (not shown) may also be provided on the PSF model for mounting the system controller 146. The PSF model may also include a removable memory card slot (not shown) for receiving a portable storage medium 86 (FIG. 3), such as a removable memory card. Generally, the components of the PSF model have the same functional characteristics as the components described above for the MPJ model (FIG. 7). The PSF model provides an alternate construction of a system controller.

Figure 10:
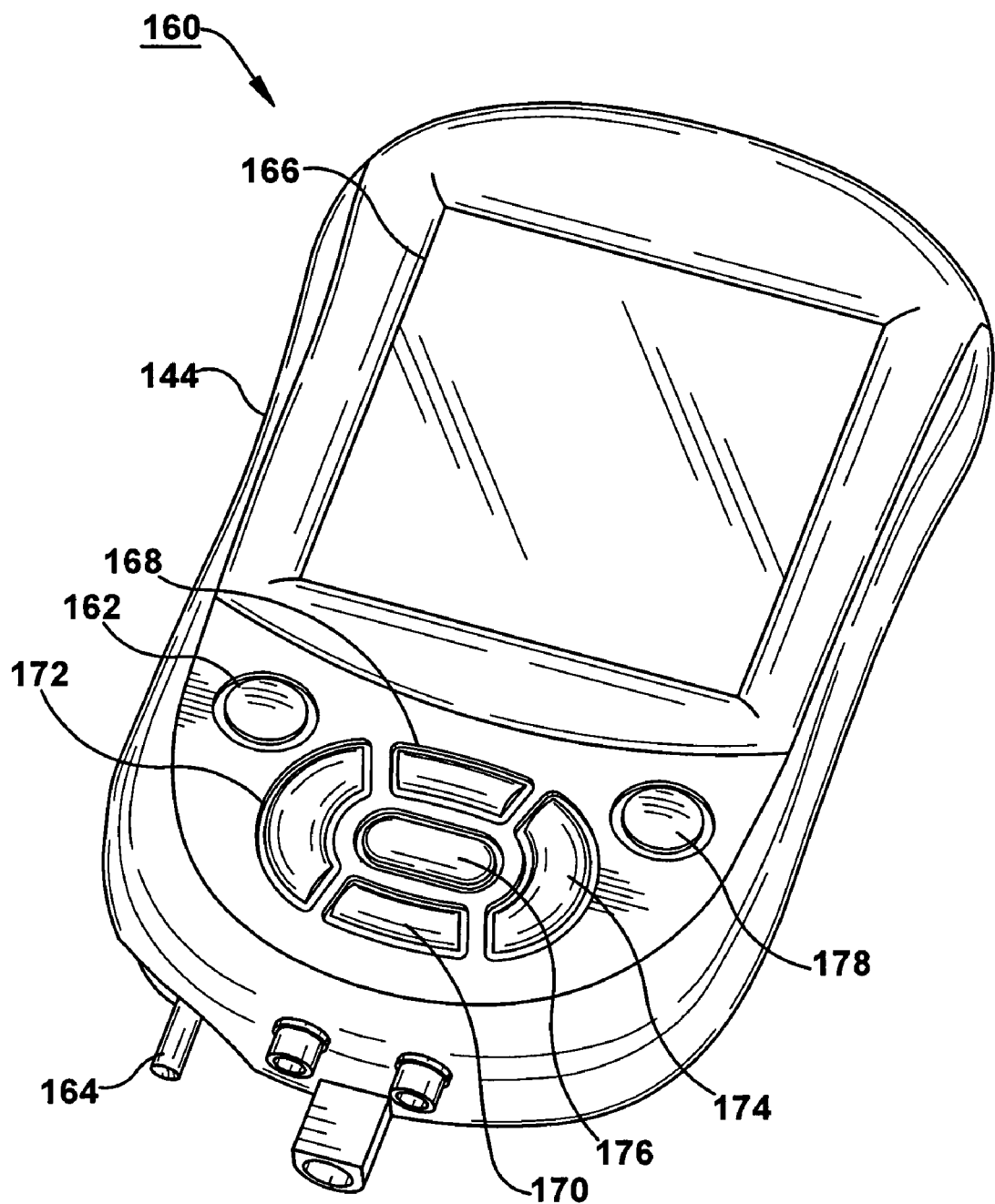

With reference to FIG. 10, yet another exemplary embodiment of a system controller 160 may include a removable memory card slot 144, an info switch 162, a power switch 164, a graphic display 166, an up direction switch 168, a down direction switch 170, a menu/left direction switch 172, a right direction switch 174, a select switch 176, and a save switch 178. This system controller 160 may be referred to as a DISPLAY model. The DISPLAY model may also include a mounting hub (not shown) for mounting the system controller 160. Generally, the removable memory card slot 144 has the same functional characteristics as described above for the MPJ model (FIG. 7).

The info switch 162, for example, may include a momentary pushbutton switch. Activation of the info switch 162 may cause the controller 160 to access and display help information. Certain information from help information file(s) may be provided on the graphic display 166. The help information provided may be related to the content of the display at or about the time the info switch 162 was activated. For example, information retrieved from help information file(s) may be context-sensitive with respect to an active screen object, such as a current menu or icon selection, a current programmable parameter selection, a current drive selection, a current mode selection, or a current error message. This provides information about a specific item as it is currently being used. The context-sensitive help information may: i) explain current selections for operation or support of the power driven wheelchair, ii) current settings for programmable parameters, iii) current selection(s) with respect to screen objects (i.e., active screen object(s)) of the display, and iv) describe an expected result from activation of the selected option. In additional embodiments, retrieval of specific information from the help information file(s) may be menu-driven, topic-driven, or driven by another suitable means.

The power switch 164, for example, may include a two position toggle switch with on and off positions. When the power switch 164 is set to the "on" position the power driven wheelchair is powered on. When the power switch 164 is switched from the "on" position to the "off" position, for example, the power driven wheelchair may begin a predetermined shutdown sequence. The graphic display 166, for example, is a 160×160 pixel display. A screen on the graphic display 166 may include about twelve lines of text by about 40 characters, about four large icons (e.g., 64×64 pixels icons), about 25 small icons (e.g., 32×32 pixel icons), or various combinations thereof. Of course, larger or smaller icons may also be used in various combinations.

The up, down, menu/left, and right direction switches 168, 170, 172, 174, for example, may include momentary pushbutton switches. The up, down, menu/left, and right direction switches 168, 170, 172, 174 may be used for directional control for menu or icon navigation, setting or modifying a programmable parameter, positional control of a selected user support surface, and other selection-type functions when directional or positional control is not required. For certain display screens, activation of the menu/left direction switch 172 may cause the controller 160 to present the previous menu on the graphic display 166. The up, down, menu/left, and right direction switches 168, 170, 172, 174, in any combination, are examples of a screen navigation control. In another embodiment, the up, down, menu/left, and right direction switches 168, 170, 172, 174, for example, may also be used for directional control for certain power driven wheelchair driving operations.

The select switch 176, for example, may include a momentary pushbutton switch. The select switch 176 may be used for selection of menu items or icons. The save switch 178, for example, may include a momentary pushbutton switch. The save switch 178 may be used for saving a displayed value of a selected programmable parameter as the current value for the parameter. The mode select, drive select, and speed control functions described above for the MPJ model (FIG. 7), for example, may be implemented through the graphic display 166, navigational control using the up, down, menu/left, and right direction switches 168, 170, 172, 174, and activation of the select or save switches 176, 178.

Figure 11:
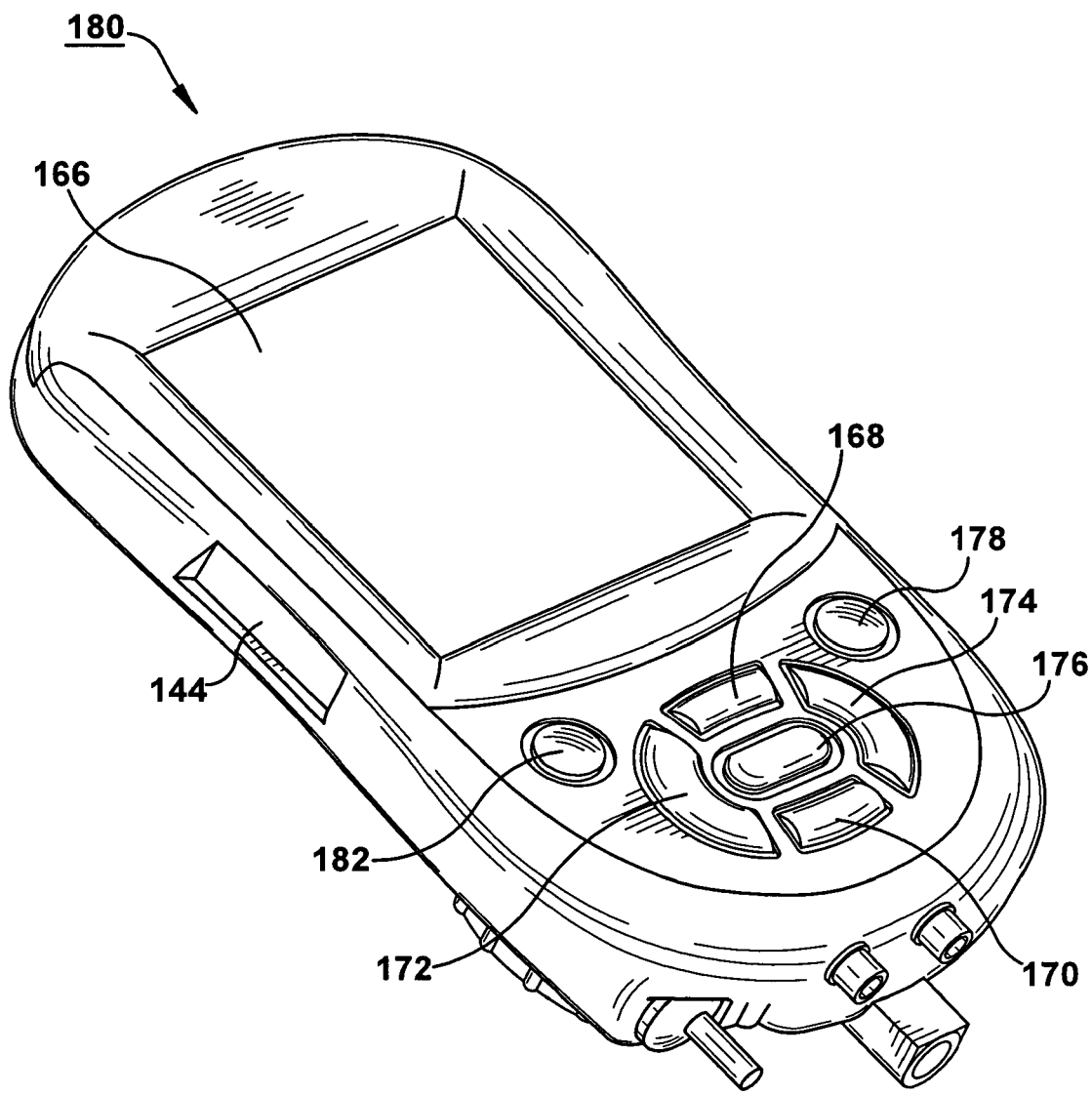
FIG. 11 is a perspective view of an exemplary embodiment of a programmer used in conjunction with related embodiments of power driven wheelchairs.

With reference to FIG. 11, an exemplary embodiment of a programmer 180 may include a removable memory card slot 144, a graphic display 166, an up direction switch 168, a down direction switch 170, a menu/left direction switch 172, a right direction switch 174, a select switch 176, a save switch 178, and a power/info switch 182. Generally, the components of the programmer 180 have the same functional characteristics as the components described above for the DISPLAY model of the system controller 160 (FIG. 10). However, the programmer 180 may combine the power and info functions in the power/info switch 182. Notably, the programmer 180 may not require the speed control functionality of the DISPLAY model. The programmer 180 may also not require other functionality of the DISPLAY model in relation to driving the power driven wheelchair or positioning the user support surfaces.

The power/info switch 182, for example, may include a momentary switch. Pressing and holding the power/info switch 182 for at least a predetermined time (e.g., three seconds) may provide control of toggling power on and power off functions. For example, if the programmer 180 is powered off, pressing and holding the power/info switch 182 for at least the predetermined time may cause the programmer 180 to be powered on. Similarly, if the programmer 180 is powered on, pressing and holding the power/info switch 182 for at least the predetermined time may cause the programmer 180 to begin a predetermined shutdown sequence. The info function may be provided by pressing and releasing the power/info switch 182 within a predetermined time (e.g., two seconds). The characteristics of the info function of the power/info switch 182 are otherwise the same as those described above for the info switch 162 of the DISPLAY model (FIG. 10).

Figure 12:
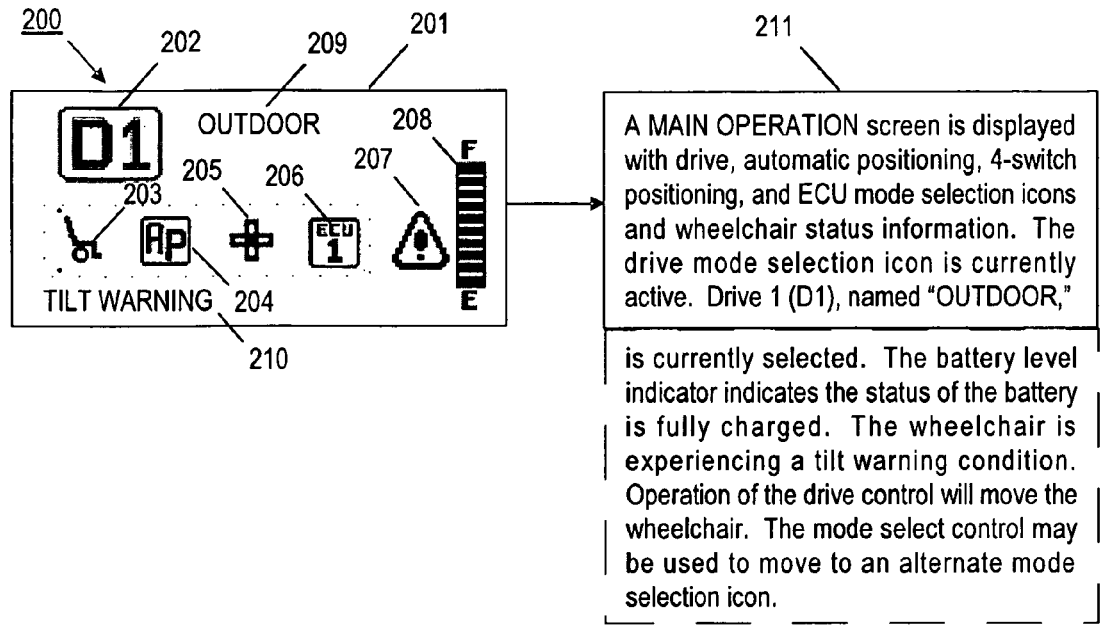
FIGS. 12 through 18 are examples of normal screen content and help information content where the help information is context-sensitive with respect to at least a portion of the normal screen content.

With reference to FIG. 12, an exemplary sequence 200 is provided with normal screen content and help information content after a help switch (e.g., info switch 124 (FIG. 7)) activation when MAIN OPERATION screen content 201 is displayed on a display device (e.g., display 126 (FIG. 7)). The MAIN OPERATION screen content 201 may include multiple screen objects, such as graphic and text objects. The graphic objects may include a current drive indicator graphic object 202 (e.g., D1), a drive mode selection icon 203, an automatic positioning mode selection icon 204 (e.g., AP), a 4-way switch positioning mode selection icon 205, an environmental control unit (ECU) mode selection icon 206 (e.g., ECU 1), a status indicator graphic object 207, and a battery level indicator graphic object 208. The text objects may include a current drive name text object 209 (e.g., OUTDOOR) and a status message text object 210 (e.g., TILT WARNING).

The drive mode selection icon 203, for example, may be active or selected by default when the MAIN OPERATION screen content 201 is displayed. As shown by the dotted lines above and below the icon in FIG. 12, the drive mode selection icon 203 is active. In other embodiments, use of a pointer or any other suitable type of highlighting can be used to indicate that a mode selection icon is active or selected. The mode selection icons can be navigated using, for example, toggle activations associated with a mode select control (not shown). The mode select control, for example, may include a momentary pushbutton switch. Navigation of the mode selection icons from left to right, for example, may be accomplished by successive toggle activations of the mode select control to advance to the next mode selection icon to the right. For example, when the ECU mode selection icon 206 is active, the next toggle activation of the mode select control may result in selection of the drive mode selection icon 203.

The power driven wheelchair may be driven when the drive mode selection icon 203 is selected. The automatic positioning mode selection icon 204 may be used to move one or more user support surfaces via an automatic positioning sequence. One or more user support surfaces may be moved via a 4-way switch control (e.g., joystick control 128 (FIG. 7, 128) up, down, menu/left, and right direction switches 168, 170, 172, 174 (FIG. 10)) when the 4-way switch positioning mode selection icon 205 is active. The ECU mode selection icon 206 may be use to control ECU operation using a 4-way switch control (e.g., joystick control 128 (FIG. 7) up, down, menu/left, and right direction switches 168, 170, 172, 174 (FIG. 10).

With the MAIN OPERATION screen content 201 displayed, a help switch activation, such as pressing the info switch (e.g., 124 (FIG. 7)) on the system controller (e.g., 120 (FIG. 7)), may cause context-sensitive help information screen content 211 to be displayed on the display device (e.g., display 126 (FIG. 7)). As shown, the following narrative is an example of what may be displayed: "A MAIN OPERATION screen is displayed with drive, automatic positioning, 4-switch positioning, and ECU mode selection icons and wheelchair status information. The drive mode selection icon is currently active. Drive 1 (D1), named "OUTDOOR," is currently selected. The battery level indicator indicates the status of the battery is fully charged. The wheelchair is experiencing a tilt warning condition. Operation of the drive control will move the wheelchair. The mode select control may be used to select an alternate mode selection icon." In additional embodiments, various portions of the exemplary context-sensitive help information may be provided in any combination after the info activation. Of course, in other embodiments, the context-sensitive help information may be presented using different words or different context-sensitive help information may be presented.

Figure 13:
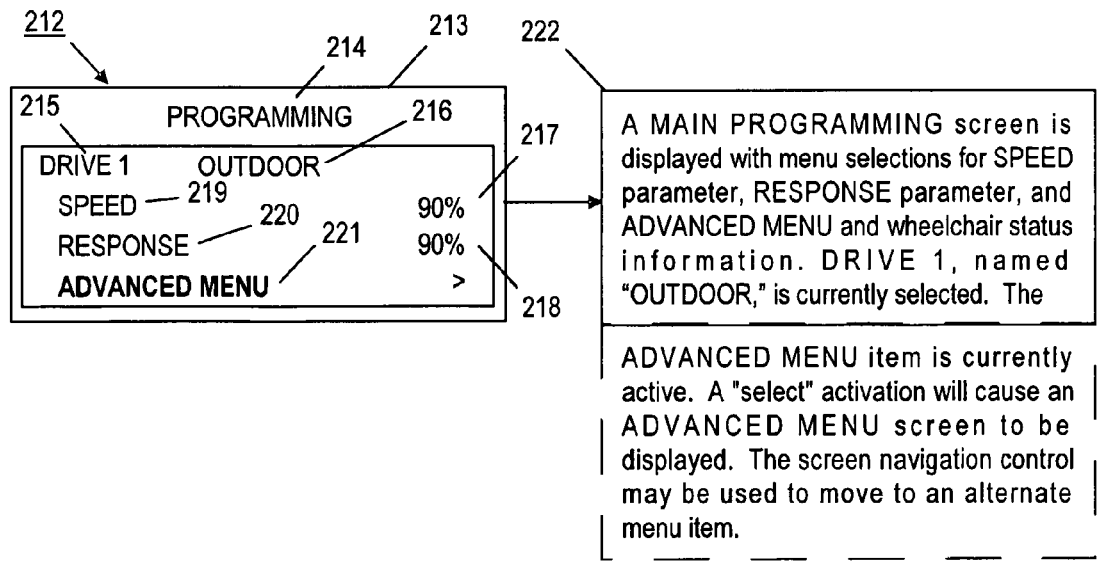

With reference to FIG. 13, an exemplary sequence 212 is provided with normal screen content and help information content after a help switch activation when MAIN PROGRAMMING screen content 213 is displayed on a display device. The MAIN PROGRAMMING screen content 213 may include multiple screen objects, such text objects providing status information and menu selections. More specifically, the text objects providing status information may include a current mode text object 214 (e.g., PROGRAMMING), a current drive number text object 215 (e.g., DRIVE 1), a current drive name text object 216 (e.g., OUTDOOR), and current value text objects for speed and response parameters 217, 218 (e.g., 90%, 90%) associated with the current drive. The text objects providing menu selections may include a SPEED text object 219, a RESPONSE text object 220, and an ADVANCED MENU text object 221.

The ADVANCED MENU text object 221, for example, may be active or selected by default when the MAIN PROGRAMMING screen content 213 is displayed. As shown by the bold text, the ADVANCED MENU text object 221 is active. In other embodiments, use of a pointer or any other suitable type of highlighting can be used to indicate that a menu selection is active or selected. The menu selections can be navigated using, for example, up or down activations associated with a screen navigation. Navigation of the menu selections using the screen navigation control, for example, may be accomplished by moving the joystick forward for an up activation or backward for a down activation. The menu selection above the active menu selection may be selected with a forward movement of the joystick. For example, when the ADVANCED MENU text object 221 is active, a forward joystick movement may result in selection of the RESPONSE text object 220.

With the MAIN PROGRAMMING screen content 213 displayed, a help switch activation may cause context-sensitive help information screen content 222 to be displayed on the display device. As shown, the following narrative is an example of what may be displayed: "A MAIN PROGRAMMING screen is displayed with menu selections for SPEED parameter, RESPONSE parameter, and ADVANCED MENU and wheelchair status information. DRIVE 1, named "OUTDOOR," is currently selected. The ADVANCED MENU item is currently active. A "select" activation will cause an ADVANCED MENU screen to be displayed. The screen navigation control may be used to move to an alternate menu item."

Figure 14:
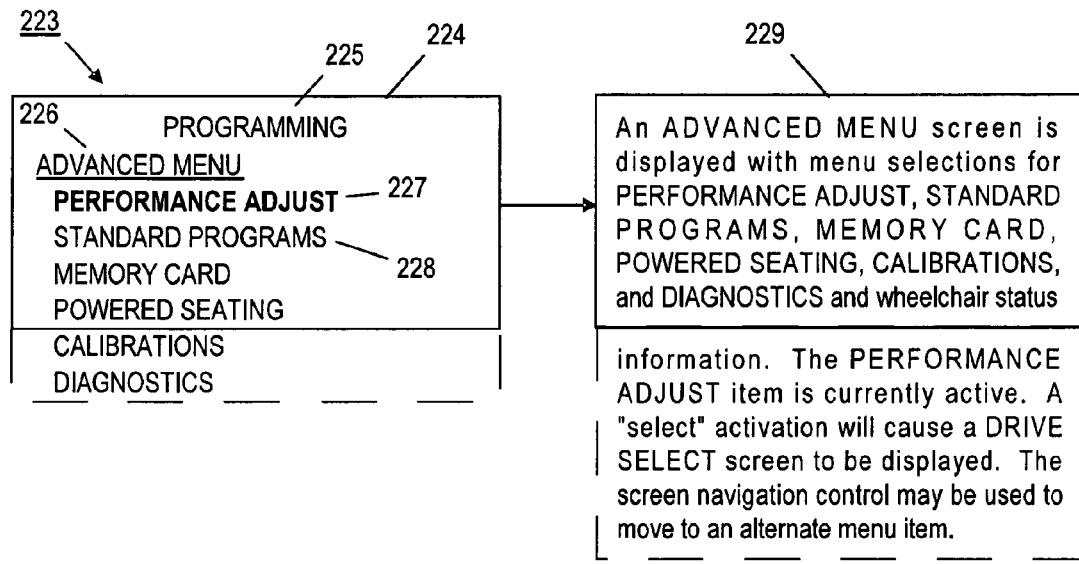

With reference to FIG. 14, an exemplary sequence 223 is provided with normal screen content and help information content after a help switch activation when ADVANCED MENU screen content 224 is displayed on a display device. The ADVANCED MENU screen content 224 may include multiple text objects providing status information and menu selections. More specifically, the text objects providing status information may include a current mode text object 225 and current menu text object 226 (e.g., ADVANCED MENU). The text objects providing menu selections may include a PERFORMANCE ADJUST text object 227, a STANDARD PROGRAMS text object 228, and additional selections related to support tasks associated with the programming mode.

The PERFORMANCE ADJUST text object 227, for example, may be active or selected by default when the ADVANCED MENU screen content 224 is displayed. As shown by the bold text, the PERFORMANCE ADJUST text object 227 is active. In other embodiments, use of a pointer or any other suitable type of highlighting can be used to indicate that a menu selection is active or selected. The menu selections can be navigated in the same manner as described above for FIG. 13.

With the ADVANCED MENU screen content 224 displayed, a help switch activation may cause context-sensitive help information screen content 229 to be displayed on the display device. As shown, the following narrative is an example of what may be displayed: "An ADVANCED MENU screen is displayed with menu selections for PERFORMANCE ADJUST, STANDARD PROGRAMS, MEMORY CARD, POWERED SEATING, CALIBRATIONS, and DIAGNOSTICS and wheelchair status information. The PERFORMANCE ADJUST item is currently active. A "select" activation will cause a DRIVE SELECT screen to be displayed. The screen navigation control may be used to move to an alternate menu item."

Figure 15:
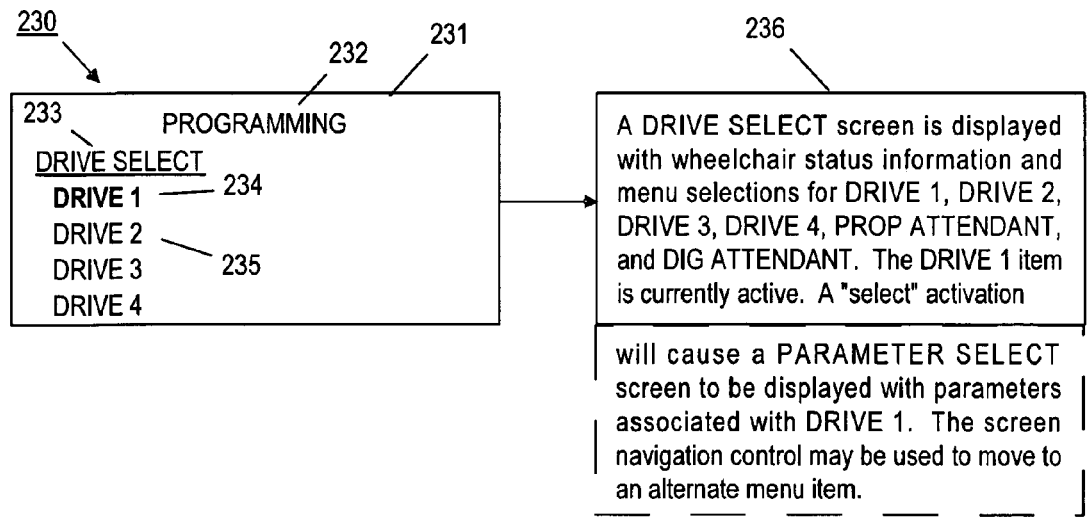

With reference to FIG. 15, an exemplary sequence 230 is provided with normal screen content and help information content after a help switch activation when DRIVE SELECT screen content 231 is displayed on a display device. The DRIVE SELECT screen content 231 may include multiple text objects providing status information and menu selections. More specifically, the text objects providing status information may include a current mode text object 232 and current menu text object 233 (e.g., DRIVE SELECT). The text objects providing menu selections may include a DRIVE 1 text object 234, a DRIVE 2 text object 235, and additional selections related to support tasks associated with the programming mode.

The DRIVE 1 text object 234, for example, may be active or selected by default when the DRIVE SELECT screen content 231 is displayed. As shown by the bold text, the DRIVE 1 text object 234 is active. In other embodiments, use of a pointer or any other suitable type of highlighting can be used to indicate that a menu selection is active or selected. The menu selections can be navigated in the same manner as described above for FIG. 13.

With the DRIVE SELECT screen content 231 displayed, a help switch activation may cause context-sensitive help information screen content 236 to be displayed on the display device. As shown, the following narrative is an example of what may be displayed: "A DRIVE SELECT screen is displayed with wheelchair status information and menu selections for DRIVE 1, DRIVE 2, DRIVE 3, and DRIVE 4. The DRIVE 1 item is currently active. A "select" activation will cause a PARAMETER SELECT screen to be displayed with parameters associated with DRIVE 1. The screen navigation control may be used to move to an alternate menu item."

Figure 16:
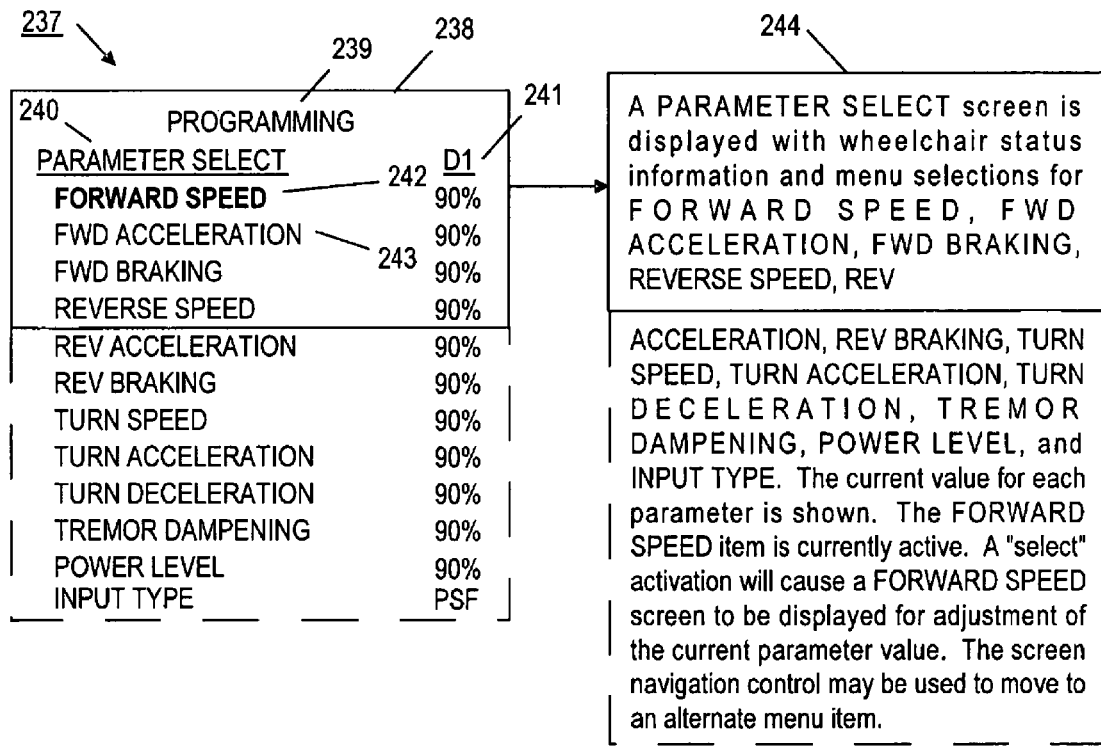

With reference to FIG. 16, an exemplary sequence 237 is provided with normal screen content and help information content after a help switch activation when PARAMETER SELECT screen content 238 is displayed on a display device. The PARAMETER SELECT screen content 238 may include multiple text objects providing status information and menu selections. More specifically, the text objects providing status information may include a current mode text object 239, current menu text object 240 (e.g., PARAMETER SELECT), current drive number text object 241 (e.g., D1), and current parameter values for each programmable (i.e., adjustable) parameter. The text objects providing menu selections may include a FORWARD SPEED text object 242, a FWD ACCELERATION text object 243, and additional selections associated with other programmable drive parameters.

The FORWARD SPEED text object 242, for example, may be active or selected by default when the PARAMETER SELECT screen content 238 is displayed. As shown by the bold text, the FORWARD SPEED text object 242 is active. In other embodiments, use of a pointer or any other suitable type of highlighting can be used to indicate that a menu selection is active or selected. The menu selections can be navigated in the same manner as described above for FIG. 13.

With the PARAMETER SELECT screen content 238 displayed, a help switch activation may cause context-sensitive help information screen content 244 to be displayed on the display device. As shown, the following narrative is an example of what may be displayed: "A PARAMETER SELECT screen is displayed with wheelchair status information and menu selections for FORWARD SPEED, FWD ACCELERATION, FWD BRAKING, REVERSE SPEED, REV ACCELERATION, REV BRAKING, TURN SPEED, TURN ACCELERATION, TURN DECELERATION, TREMOR DAMPENING, POWER LEVEL, and INPUT TYPE. The current value for each parameter is shown. The FORWARD SPEED item is currently active. A "select" activation will cause a FORWARD SPEED screen to be displayed for adjustment of the current parameter value. The screen navigation control may be used to move to an alternate menu item."

Figure 17:
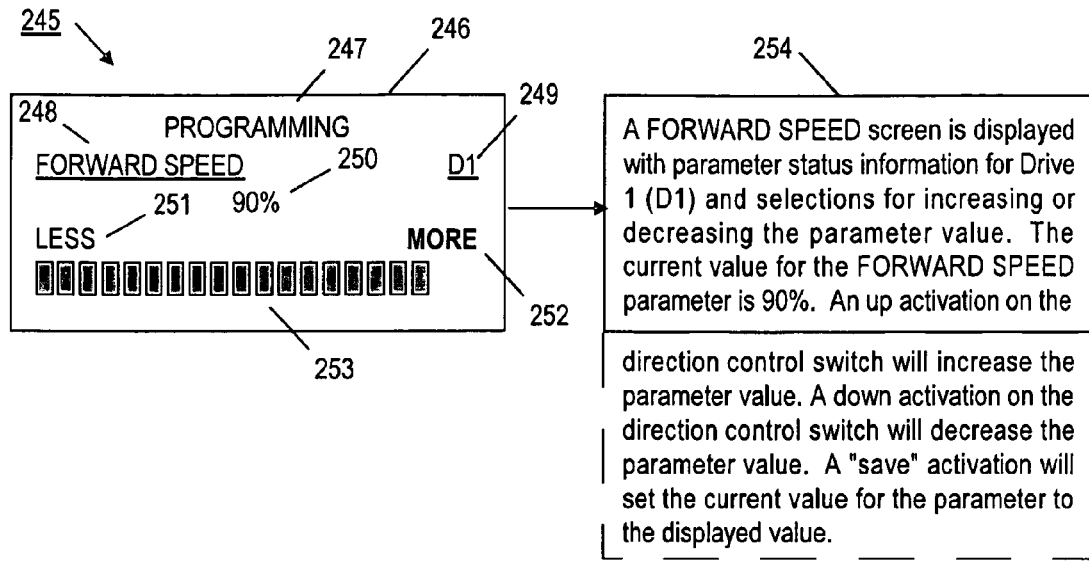

With reference to FIG. 17, an exemplary sequence 245 is provided with normal screen content and help information content activation when FORWARD SPEED screen content 246 is displayed on a display device. The FORWARD SPEED screen content 246 may include multiple text objects providing status information and parameter adjustment. More specifically, the text objects providing status information may include a current mode text object 247, current drive parameter text object 248 (e.g., FORWARD SPEED), current drive number text object 249, and current parameter value text object 250 (e.g., 90%). The text objects providing parameter adjustment may include a decrease parameter text object 251 (e.g., LESS) and an increase parameter text object 252 (e.g., MORE).

The FORWARD SPEED screen content 246 allows a user to set/modify the current value of the forward speed programmable parameter. The forward speed programmable parameter, for example, is a "range" parameter. In other words, it can be set to values between minimum and maximum limits (inclusive or exclusive) in predetermined increments via MORE or LESS activations. These MORE or LESS activations, for example, can be accomplished by moving a joystick control (e.g., 128 (FIG. 7)) forward for an up (i.e., MORE) activation or backward for a down (i.e., LESS) activation. In another embodiment, the MORE or LESS activations, for example, can be accomplished using up and down direction switches (e.g., 168, 170 (FIG. 10)), respectively. The decrease parameter and increase parameter text objects 251, 252, for example, use of a pointer or may be highlighted to reflect whether the last adjustment to the displayed parameter value was an increase or a decrease. As shown, the increase parameter text object 252 (e.g., MORE) in the FORWARD SPEED screen 232 is highlighted in bold. In additional embodiments, use of a pointer or any suitable type of highlighting may be used. In response to MORE or LESS activations, for example, a status bar 253 and the current parameter value text object 250 are updated incrementally for each activation. For example, each activation may adjust the parameter value by five percent and add or remove a segment from the status bar.

With the FORWARD SPEED screen content 246 display, a help switch activation may cause context-sensitive help information screen content 254 to be displayed on the display device. As shown, the following narrative is an example of what may be displayed: "A FORWARD SPEED screen is displayed with parameter status information for Drive 1 (D1) and selections for increasing or decreasing the parameter value. The current value for the FORWARD SPEED parameter is 90%. An up activation on the direction control switch will increase the parameter value. A down activation on the direction control switch will decrease the parameter value. A "save" activation will set the current value for the parameter to the displayed value."

Figure 18:
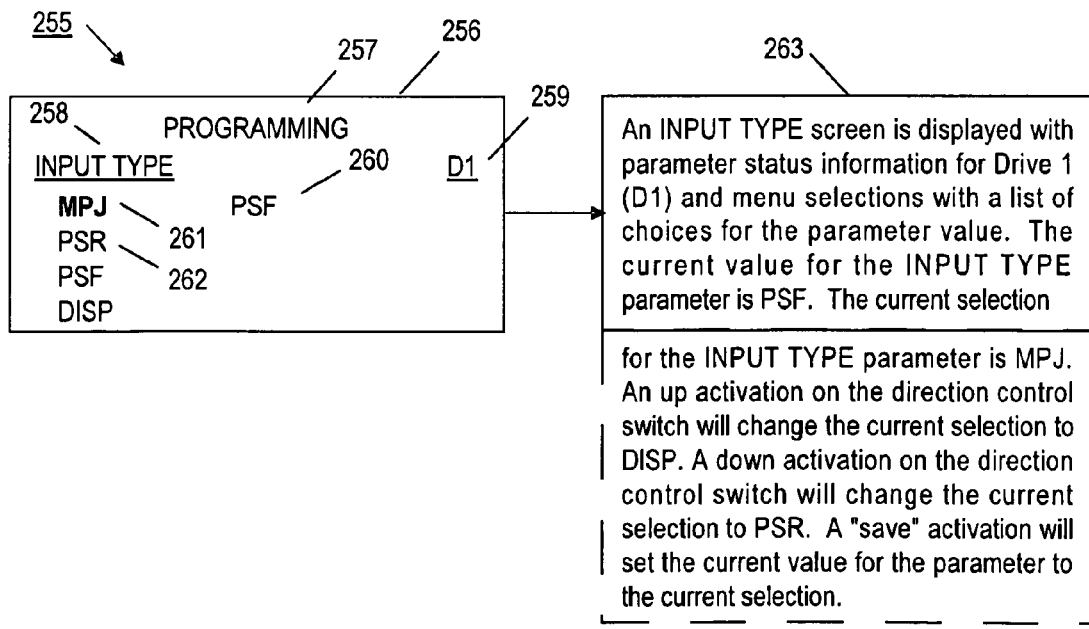

With reference to FIG. 18, an exemplary sequence 255 is provided with normal screen content and help information content after a help switch activation when INPUT TYPE screen content 256 is displayed on a display device. The INPUT TYPE screen content 256 may include multiple text objects providing status information and menu selections for parameter adjustment. More specifically, the text objects providing status information may include a current mode text object 257, current drive parameter text object 258 (e.g., INPUT TYPE), current drive number text object 259, and current parameter value text object 260 (e.g., PSF). The text objects providing menu selections may include an MPJ text object 261, a PSR text object 262, and additional selections related to other models of system controllers.

The INPUT TYPE screen content 256 allows a user to set/modify the current setting for the input type programmable parameter. The input type programmable parameter, for example, is a "choice" parameter. In other words, it can be set to any choice within a list of choices. The list of choices may be arranged in a menu as shown in FIG. 18. For example, as shown, the menu selections may include MPJ for multi-purpose joystick system controller, PSR for personalized switch rear-mount joystick system controller, PSF for personalized switch forward-mount joystick system controller, and DISP for display system controller. The menu selections can be navigated in the same manner as described above for FIG. 13.

With the INPUT TYPE screen content 256 display, a help switch activation may cause context-sensitive help information screen content 263 to be displayed on the display device. As shown, the following narrative is an example of what may be displayed: "An INPUT TYPE screen is displayed with parameter status information for Drive 1 (D1) and menu selections with a list of choices for the parameter value. The current value for the INPUT TYPE parameter is PSF. The current selection for the INPUT TYPE parameter is MPJ. An up activation on the direction control switch will change the current selection to DISP. A down activation on the direction control switch will change the current selection to PSR. A "save" activation will set the current value for the parameter to the current selection."

Figure 19:
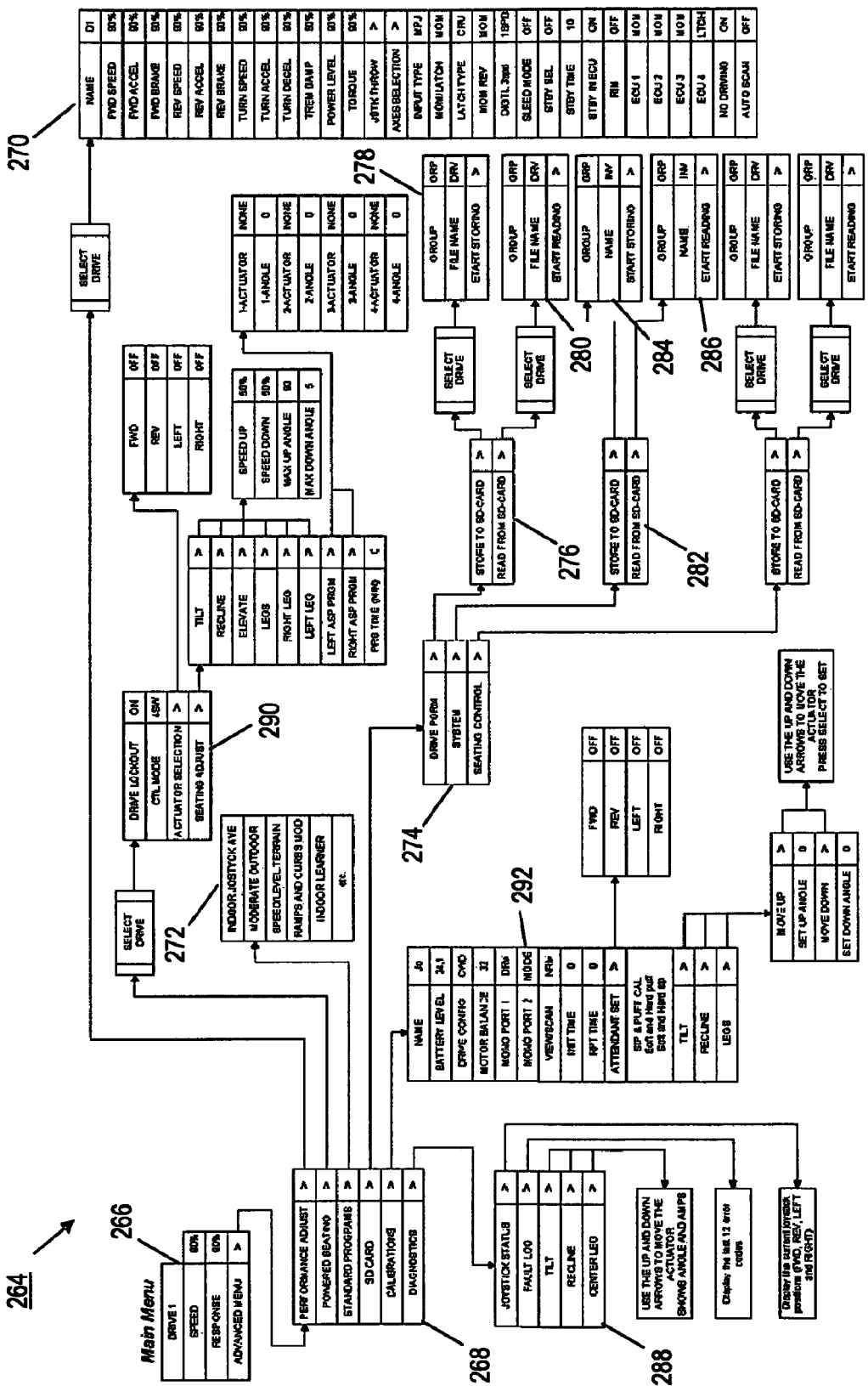
FIG. 19 is an exemplary menu hierarchy for a programming mode associated with operation or support of a power driven wheelchair.

With reference to FIG. 19, an exemplary programming mode menu hierarchy 264 for setting or modifying a programmable parameter associated with operation of a power driven wheelchair begins with a main menu 266. A similar embodiment of the main menu 266 is also depicted in FIG. 13 and described above in more detail. An advanced menu 268 may be selected from the main menu 266. A similar embodiment of the advanced menu 268 is described above in more detail with reference to FIG. 14. Performance adjust 270 may be selected after from the advanced menu 268. A similar embodiment of the performance adjust 270 is described above in more detail with reference to FIG. 16.

A standard programs menu 272 may be selected from the advanced menu 268. An SD card menu 274 may also be selected from the advanced menu 254. Additional menus or items, such as a drive pgrm (program) item 276, a store (drive program) to SD card item 278, a read (drive program) from SD card item 280, a system item 282, a store (system) to SD card item 284, and a read (system) from SD card item 286 may be selected within the hierarchy of the SD card menu 274. In other embodiments, the SD card menu 274 may be referred to as a removable memory card menu or a portable storage medium menu. Additional menus or lists, such as a diagnostics menu 288, a powered seating menu 290, and a calibrations menu 292 may also be selected from the advanced menu 268.

Figure 20:
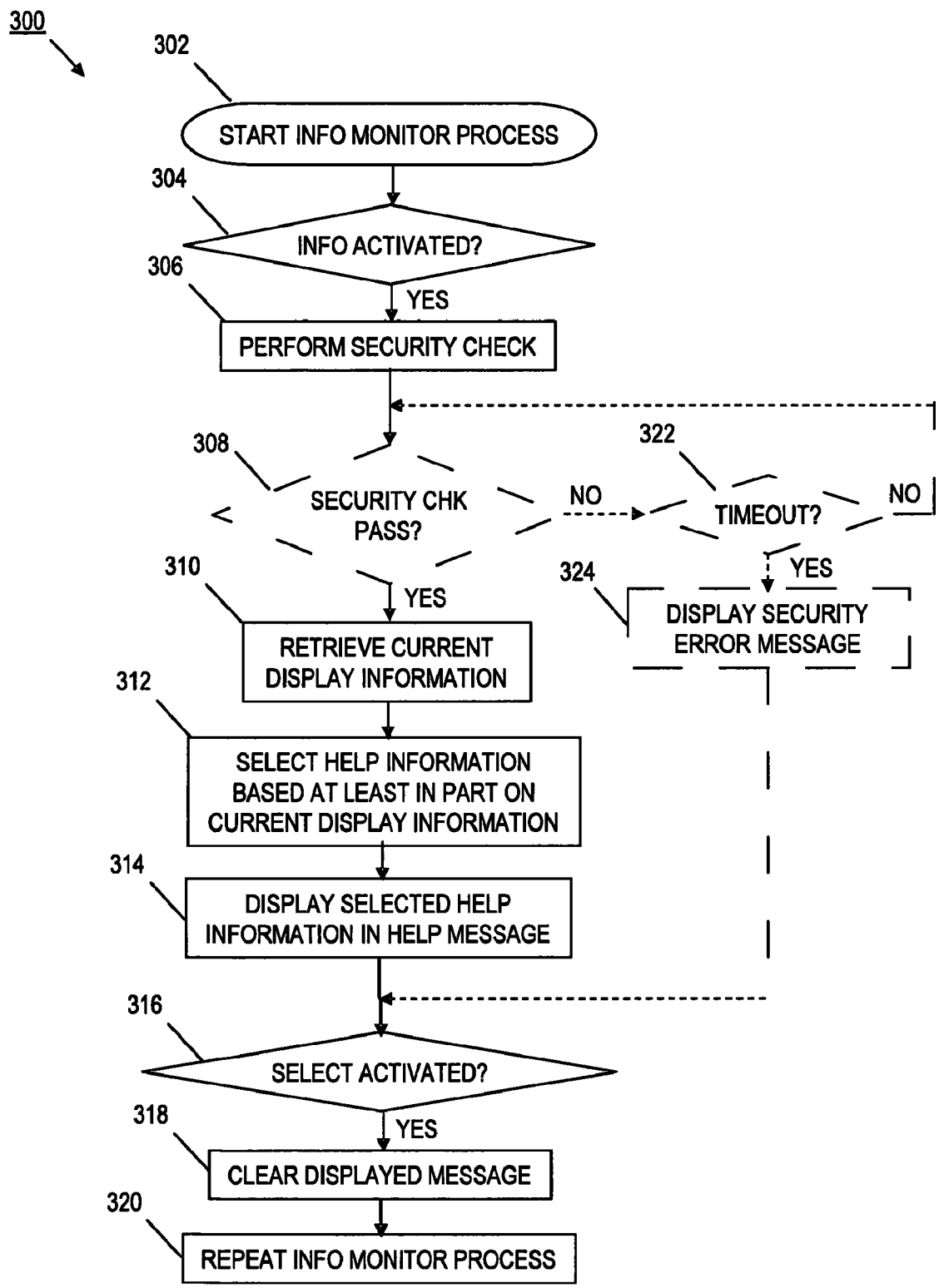
FIG. 20 is a flow chart of an exemplary info monitor process associated with providing context-sensitive help on a display device associated with operation or support of a power driven wheelchair.

With reference to FIG. 20, an exemplary info monitor process 300 associated with providing context-sensitive help on a display device associated with a power driven wheelchair begins at 302 where the process starts. At 304, the process detects activation of an info switch (e.g., 124 (FIG. 7)). In another embodiment, the process may periodically check the condition of the info switch.

If the info switch was activated, for example, a security check may be performed prior to displaying context-sensitive help (306). This security check is optional and not required, particularly in regard to context-sensitive help functions. It is described here because in certain applications users, attendants, and technicians may have different privileges with regard to operation and support of the power driven wheelchair. A security check facilitates limiting access to one or more features provided in the power driven wheelchair. Context-sensitive help may be provided for features that do not require a security check as well as those features that do require a security check.

In one embodiment, the security check, for example, may include a hardware or software key associated with insertion of an appropriate portable storage medium (e.g., 86 (FIG. 3)), for example, in a removable memory card slot (e.g., 144 (FIG. 8)) of a system controller (e.g., 140 (FIG. 8)). In another embodiment, the security check, for example, may include a hardware or software key associated with connection of the programmer (e.g., 60 (FIG. 2)) to the system controller (e.g., 32 (FIG. 2)). If the programmer is being used, the security check may include a key status signal transmitted by the programmer to the system controller.

If the security check passes at 308, information associated with a current display screen is retrieved in 310. For example, current mode and drive selections, current menu or icon selections, or current stored values or current displayed values for selected programmable parameters. In various embodiments, various individual or combinations of information elements associated with the current display screen may be retrieved. At 312, context-sensitive help information is selected from a collection of help information based at least in part on the current display information retrieved. Next, the identified context-sensitive help information is constructed into a narrative message form and displayed in a display screen. In another embodiment, the context-sensitive help information may be displayed in a window or dialog box on the display.

At 316, the process, for example, detects a select activation. For example, a select activation may be provided by moving a joystick control (e.g., 128 (FIG. 7)) to the right or by pressing a select switch (e.g., 176 (FIG. 10)). In another embodiment, the process may periodically check the condition of any component that may provide a select activation. If a select activation was detected, for example, the message (e.g., context-sensitive help message) may be cleared from the display. In other words, for example, the display may be returned to the condition it was in prior to the last info activation. At this stage, the info monitor process is repeated 320 so that another info activation can be detected.

If the security check does not pass at 308, the process advances to 322 to determine if a predetermined timeout period has expired. If the timeout period is not expired, the process returns to 308 to determine if the security check passed. If the timeout period is expired at 322, a security error message may be displayed (324) and the process advances to 316, for example, to wait for the error message to be cleared by a select activation. The various aspects of FIG. 20 described above may be automated, semi-automated, or manual and may be implemented through hardware, software, firmware, or combinations thereof.

Figure 21:
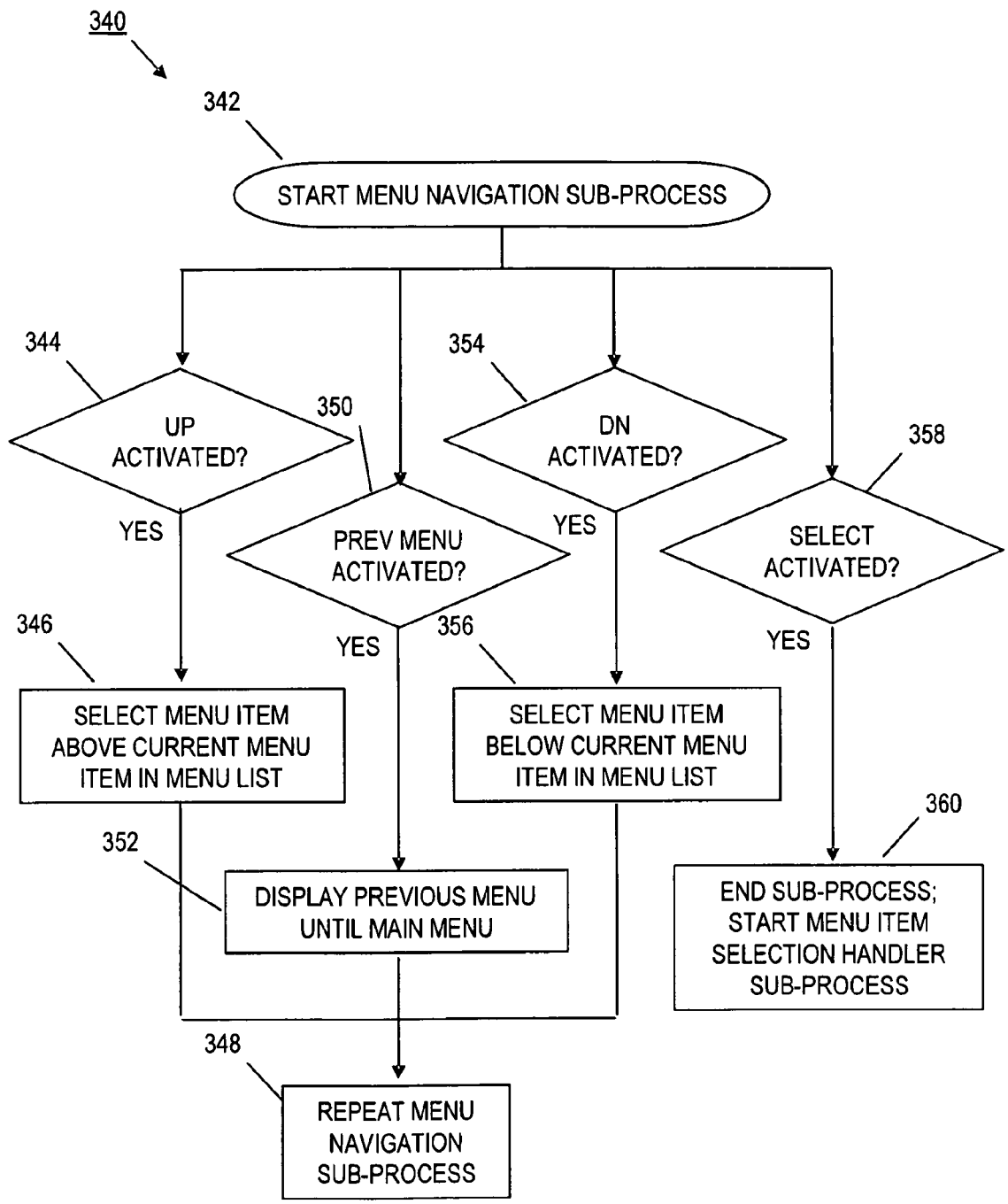
FIG. 21 is a flow chart of an exemplary menu navigation sub-process associated with interactive use of a display device and a screen navigation control in conjunction with operation or support of a power driven wheelchair.

With reference to FIG. 21, an exemplary menu navigation sub-process 340 associated with setting or modifying a programmable parameter begins at 342 where the sub-process starts. At 344, the process may detect an up activation. If an up activation is not detected, the process does not advance beyond 344. For example, moving a joystick control (e.g., 128 (FIG. 7)) forward or pressing an up direction switch (e.g., 168 (FIG. 10)) may provide an up activation. If an up activation is detected, the menu item above the current menu item may be selected and highlighted to indicate the newly selected menu item (346). The previously highlighted menu item may be returned to normal text. Next, at 348, the menu navigation sub-process may be repeated.

At 350, the process may detect a previous menu activation. If a previous menu activation is not detected, the process does not advance beyond 350. For example, moving a joystick control (e.g., 128 (FIG. 7)) to the left or pressing a menu/left direction switch (e.g., 172 (FIG. 10)) may provide an previous menu activation. If a previous menu activation is detected, the previous menu in a menu hierarchy (e.g., 264 (FIG. 19)) may be displayed (352), unless, for example, the current menu is the main menu. Next, at 348, the menu navigation sub-process may be repeated with respect to the previous menu.

At 354, the process detects a down activation. If a down activation is not detected, the process does not advance beyond 354. For example, moving a joystick control (e.g., 128 (FIG. 7)) backward or pressing a down direction switch (e.g., 170 (FIG. 10)) may provide a down activation. If a down activation is detected, the menu item below the current menu item may be selected and highlighted to indicate the newly selected menu item (356). The previously highlighted menu item may be returned to normal text. Next, at 348, the menu navigation sub-process may be repeated.

At 358, the process detects a select activation. If a select activation is not detected, the process does not advance beyond 358. For example, moving a joystick control (e.g., 128 (FIG. 7)) to the right or pressing a select switch (e.g., 176 (FIG. 10)) may provide a select activation. If a select activation is detected, the menu navigation sub-process may be ended and a menu item selection handler sub-process may be started to determine if the selection leads, for example, to a lower level menu or to a screen to set/modify a programmable parameter.

In another embodiment, the menu navigation sub-process 340 may periodically check the condition of the corresponding components associated with an up activation, previous menu activation, down activation, and select activation in a loop to determine if corresponding activations occur. The various aspects of FIG. 21 described above may be automated, semi-automated, or manual and may be implemented through hardware, software, firmware, or combinations thereof.

Figure 22:
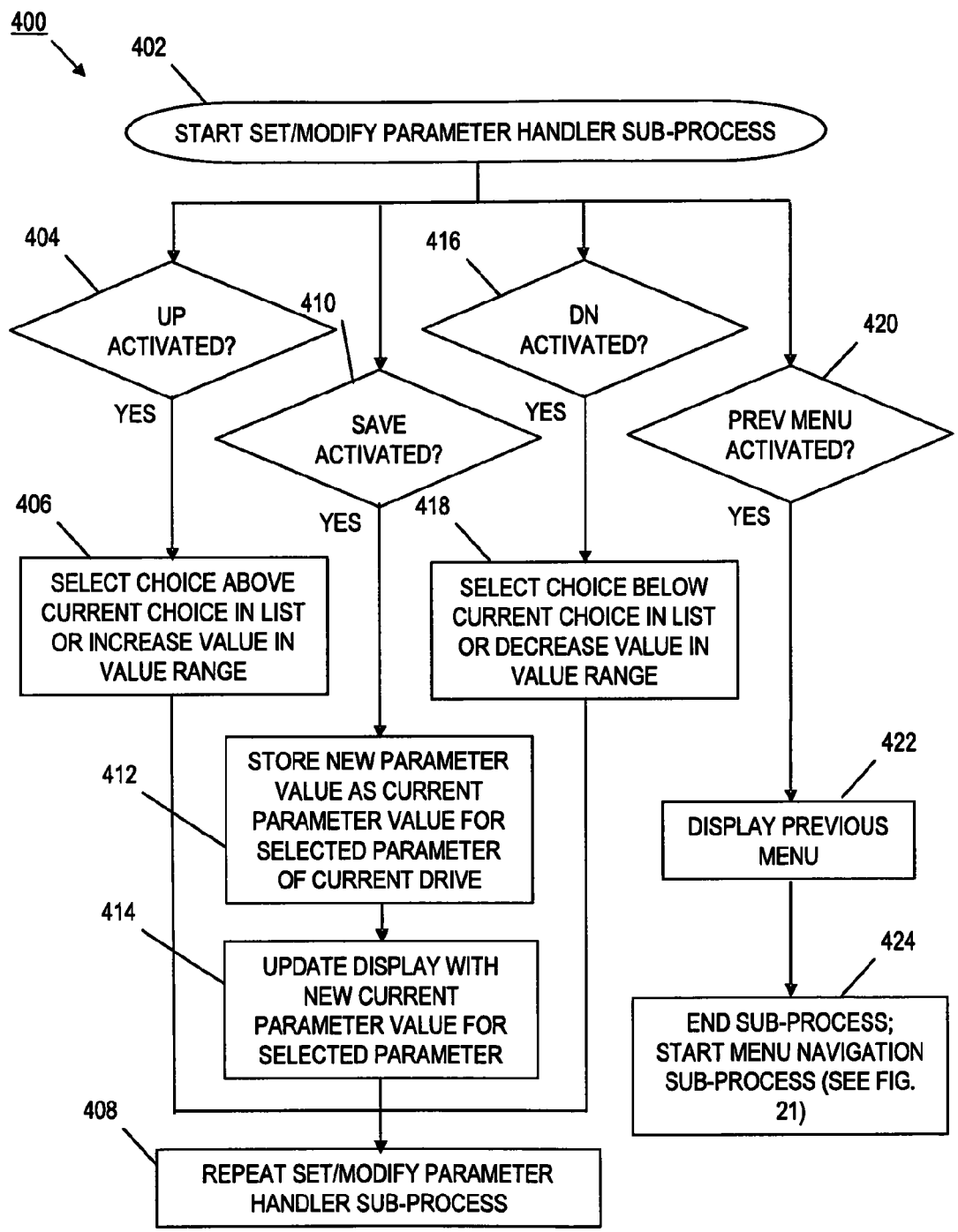
FIG. 22 is a flow chart of an exemplary set/modify parameter handler sub-process associated with interactive use of a display device and screen navigation control in conjunction with operation or support of a power driven wheelchair.

With reference to FIG. 22, an exemplary set/modify parameter handler sub-process 400 associated with setting or modifying a programmable parameter begins at 402 where the sub-process starts. At 404, the process may detect an up activation. If an up activation is not detected, the process does not advance beyond 404. If an up activation is detected, the parameter value choice above the current parameter value choice may be selected and highlighted to indicate the newly selected parameter value from a list of parameter value choices (i.e., when the selected programmable parameter is a "choice" parameter) (406). Alternatively, when the selected programmable parameter is a "range" parameter, if an up activation is detected, the selected parameter value may be increased to the next predetermined higher value within the range of values for the corresponding programmable parameter (406). For the "range" parameter adjustment, a MORE screen object may be highlighted to indicate the last adjustment made to the selected programmable parameter was based on an up activation. Next, at 408, the set/modify parameter handler sub-process may be repeated.

At 410, the process may detect a save activation. If a save activation is not detected, the process does not advance beyond 410. For example, moving a joystick control (e.g., 128 (FIG. 7)) to the right or pressing a save switch (e.g., 178 (FIG. 10)) may provide a save activation. If a save activation is detected, the new parameter value may be stored as the current parameter value for the selected programmable parameter of the currently selected drive (412). At 414, the set/modify parameter display may be updated with the new current parameter value for the selected programmable parameter of the currently selected drive. Next, at 408, the set/modify parameter handler sub-process may be repeated.

At 416, the process may detect a down activation. If a down activation is not detected, the process does not advance beyond 416. If an down activation is detected, the parameter value choice below the current parameter value choice may be selected and highlighted to indicate the newly selected parameter value from the list of parameter value choices (i.e., when the selected programmable parameter is a "choice" parameter) (406). Alternatively, when the selected programmable parameter is a "range" parameter, if a down activation is detected, the selected parameter value may be decreased to the next predetermined lower value within the range of values for the corresponding programmable parameter (406). For the "range" parameter adjustment, a LESS screen object may be highlighted to indicate the last adjustment made to the selected programmable parameter was based on a down activation. Next, at 408, the set/modify parameter handler sub-process may be repeated.

At 420, the process detects a previous menu activation. If a previous menu activation is not detected, the process does not advance beyond 420. If a previous menu activation is detected, the previous menu in a menu hierarchy (e.g., 264 (FIG. 19)) may be displayed (422), unless, for example, the current menu is the main menu. Next, at 424, the set/modify parameter handler sub-process may be ended and a menu navigation sub-process (see FIG. 21) may be started.

In another embodiment, set/modify parameter handler sub-process 400 may periodically check the condition of the corresponding components associated with an up activation, save activation, down activation, and previous menu activation in a loop to determine if corresponding activations occur. The various aspects of FIG. 22 described above may be automated, semi-automated, or manual and may be implemented through hardware, software, firmware, or combinations thereof.

Figure 23:
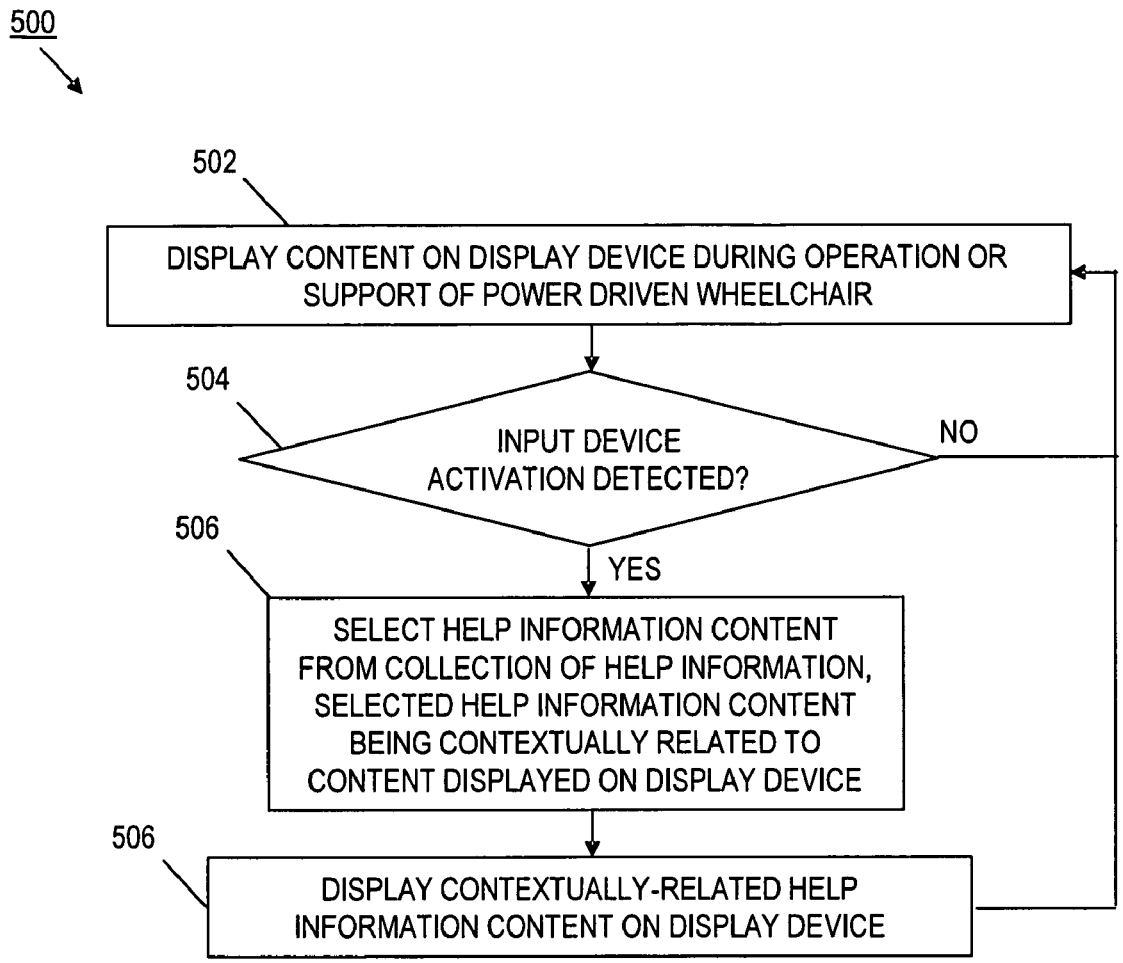
FIG. 23 is a flow chart of an exemplary process for providing help information on a display device associated with a power driven wheelchair.

With reference to FIG. 23, an exemplary process 500 for providing help information on a display device associated with a power driven wheelchair begins at 502 where normal screen content displayed on the display device is updated during operation or support of the power driven wheelchair. At 504, the process determines if a first input device was selectively activated. Next, in response to detection of the first input device activation, help information content is selected from a collection of help information (506). The selected help information content being contextually related to the normal screen content displayed on the display device. At 508, the contextually-related help information content is displayed on the display device. At this point, the process may return to 502 to continue displaying normal screen content on the display device. At 504, if activation of the first input device is not detected, the process also may return to 502.

In another embodiment, the normal screen content, during at least a portion of the operation or support, may include one or more screen objects. In this embodiment, the process may also detect selective activation of a second input device. In response to detection of the second input device activation, a first screen object from the one or more screen objects may be designated as active within the normal screen content. In this embodiment, the selected help information content may also be contextually related to the first screen object within the normal screen content displayed on the display device.

In another embodiment, the one or more screen objects may include, for example, one or more of a menu item, an active text object, a check box, an icon, a control button, or a radio button. In still another embodiment, the contextually-related help information content may be displayed on the display device in a full screen view, a window, or a dialog box.

In another embodiment, the contextually-related help information content may be retrieved from a portable storage medium via a storage medium interface associated with the power driven wheelchair. In this embodiment, the portable storage medium may include a removable memory device that is releasably received by the storage medium interface. Moreover, the removable memory device may store the collection of help information. In various embodiments, the removable memory device may include an SD card, a CF card, a flash memory pen drive, a memory stick, a microdrive, an MMC, an SM card, an xD picture card, or a SIM card. The various aspects of FIG. 23 described above may be automated, semi-automated, or manual and may be implemented through hardware, software, firmware, or combinations thereof.

Figure 24:
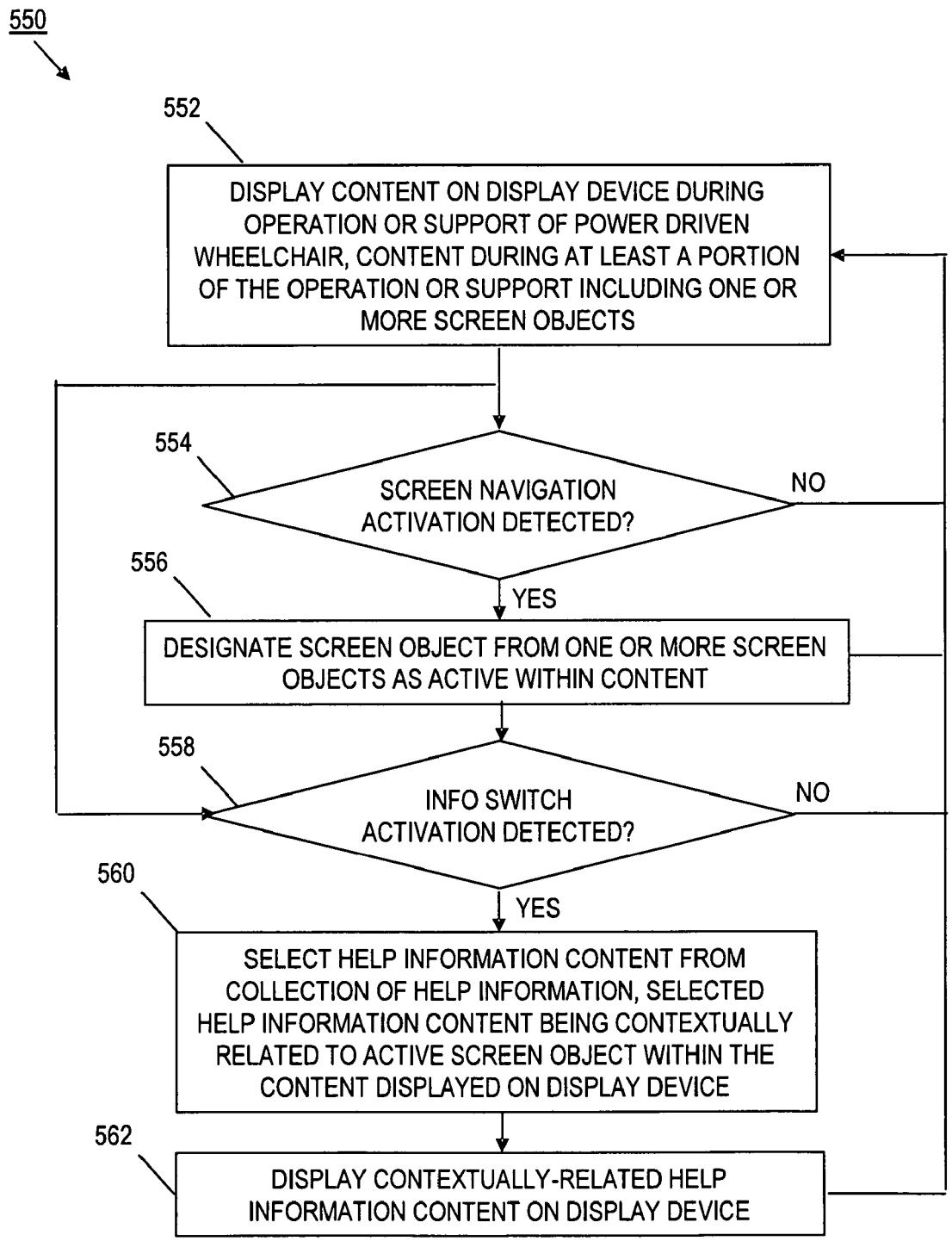
FIG. 24 is a flow chart of another exemplary process for providing help information on a display device associated with a power driven wheelchair.

With reference to FIG. 24, an exemplary process 550 for providing help information on a display device associated with a power driven wheelchair begins at 552 where normal screen content displayed on the display device is updated during operation or support of the power driven wheelchair. In this embodiment, the normal screen content, during at least a portion of the operation or support, may include one or more screen objects. At 554, the process determines if a screen navigation control was selectively activated. Next, in response to detection of the screen navigation control activation, a first screen object from the one or more screen objects is designated as active within the normal screen content (556). At 558, the process determines if a help switch was selectively activated. Next, in response to detection of the help switch activation, help information content is selected from a collection of help information (560). The selected help information content being contextually related to the active screen object within the normal screen content displayed on the display device. At 562, the contextually-related help information content is displayed on the display device. At this point, the process may return to 552 to continue displaying normal screen content on the display device. At 554, if activation of the screen navigation control is not detected, the process also may return to 552. Likewise, at 558, if activation of the help switch is not detected, the process also may return to 552.

In another embodiment, the screen navigation control may include at least one of a right activation, a down activation, an up activation, or a left activation. In still another embodiment, the one or more screen objects may include one or more of a menu item, an active text object, a check box, an icon, a control button, or a radio button. In yet another embodiment, the process may include displaying the contextually-related help information content on the display device in a full screen view, a window, or a dialog box.

In still yet another embodiment, the process may include retrieving the contextually-related help information content from a removable memory device via a storage medium interface associated with the power driven wheelchair. In this embodiment, the removable memory device may be releasably received by the storage medium interface and may store the collection of help information. Moreover, the removable memory device may include an SD card, a CF card, a flash memory pen drive, a memory stick, a microdrive, an MMC, an SM card, an xD picture card, or a SIM card. The various aspects of FIG. 24 described above may be automated, semi-automated, or manual and may be implemented through hardware, software, firmware, or combinations thereof.

Figure 25:
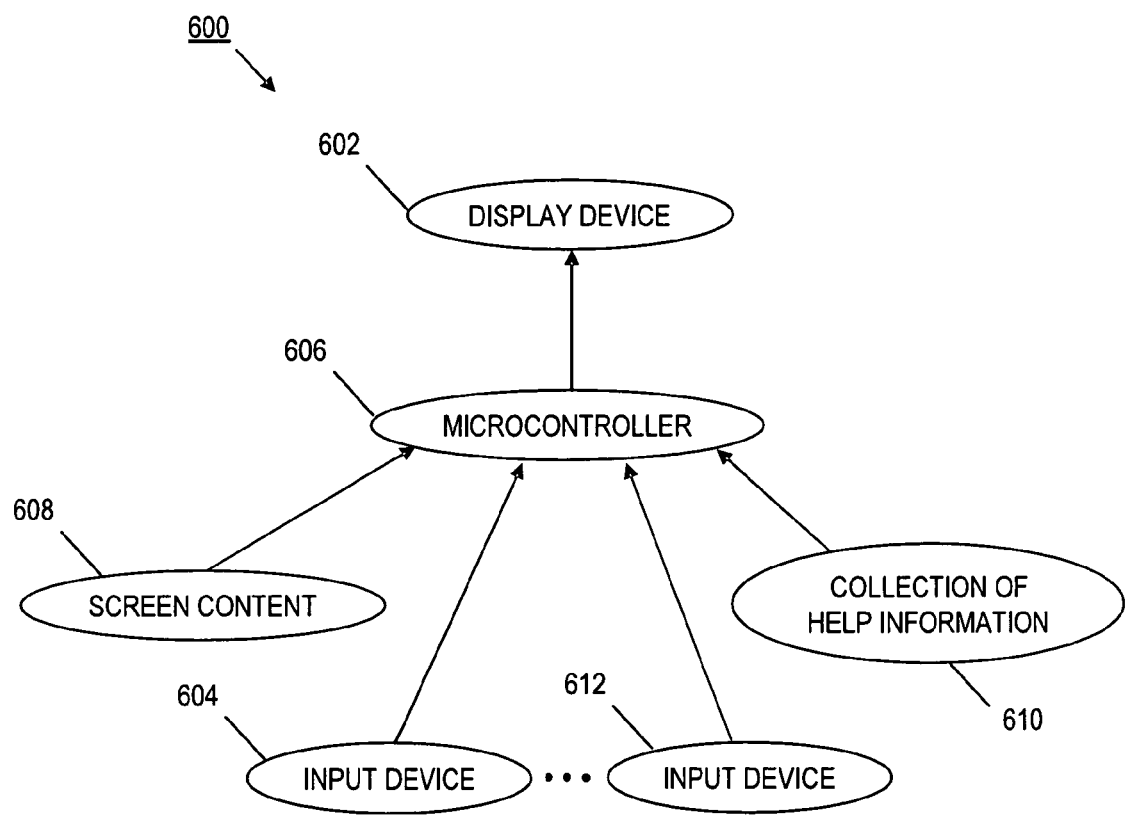
FIG. 25 is a block diagram of an exemplary apparatus for providing help information on a display device associated with a power driven wheelchair.

With reference to FIG. 25, an apparatus 600 associated with a power driven wheelchair may include a display device 602, a first input device 604, a microcontroller 606, screen content 608, a collection of help information 610, and a second input device 612. The display device 602 may selectively display screen content during operation or support of the power driven wheelchair. The first input device 604 may be selectively activated by, for example, a user, an attendant, or a technician. The microcontroller 606 may be in operative communication with the display device and the first input device. The microcontroller 606 may control the screen content 608 displayed on the display device 602 during the operation or support and detects activation of the first input device 604. In response to detection of the first input device activation, the microcontroller 606 may select help information content from a collection of help information 610. The selected help information content may be contextually related to the screen content 608 displayed on the display device. Additionally, the microcontroller 606 may control display of the contextually-related help information content on the display device 602.

In another embodiment, the screen content 608, during at least a portion of the operation or support, may include one or more screen objects. In the embodiment, the apparatus 600 may include the second input device 612 for selective activation. The second input device 612 may be in communication with the microcontroller 606. The microcontroller 606 may detect selective activation of the second input device 612 and, in response to detection of the second input device activation, may control designation of a first screen object from the one or more screen objects as active within the screen content 608. In this embodiment, the selected help information content may be contextually related to the first screen object within the screen content 608 displayed on the display device 602. In still another embodiment, the one or more screen objects may include one or more of a menu item, an active text object, a check box, an icon, a control button, or a radio button. In yet another embodiment, the contextually-related help information content may be displayed on the display device in a full screen view, a window, or a dialog box.

In another embodiment, the apparatus 600 may also include a storage medium interface 72 (FIG. 3), 98 (FIG. 4) in operative communication with the microcontroller 606 and a portable storage medium 86 (FIG. 3), 106 (FIG. 4) in operative communication with the storage medium interface and storing the collection of help information 610. In still another embodiment, the portable storage medium may includes a removable memory device that is releasably received by the storage medium interface, the removable memory device storing the collection of help information 610. The removable memory device may include a SD card, a CF card, a flash memory pen drive, a memory stick, a microdrive, an MMC, an SM card, an xD picture card, or a SIM card. The various aspects of FIG. 25 described above may be automated, semi-automated, or manual and may be implemented through hardware, software, firmware, or combinations thereof.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. An apparatus associated with a power driven wheelchair, including:

a display device to selectively display screen content during operation or support of the power driven wheelchair;
a first input device for selective activation; and
a microcontroller in operative communication with the display device and the first input device;
wherein the microcontroller controls the content displayed on the display device during the operation or support and detects activation of the first input device; and
wherein, in response to detection of the first input device activation, the microcontroller selects help information content from a collection of help information, the selected help information content being contextually related to multiple screen objects simultaneously displayed on the display device, and simultaneously displays the contextually-related help information content for the multiple screen objects on the display device.

2. The apparatus of claim 1 further including:
a second input device for selective activation in communication with the microcontroller;
wherein the microcontroller detects selective activation of the second input device and, in response to detection of the second input device activation, controls designation of a first screen object from the multiple screen objects simultaneously displayed as active within the screen content; and
wherein the selected help information content is contextually related to the first screen object within the screen content displayed on the display device.

3. The apparatus of claim 1 wherein the screen objects include a menu item, an active text object, a check box, an icon, a control button, or a radio button.

4. The apparatus of claim 1 wherein the contextually-related help information content is displayed on the display device in a full screen view, a window, or a dialog box.

5. The apparatus of claim 1 wherein the multiple screen objects comprise objects associated with an operation mode of a power driven wheelchair or a support mode of a power driven wheelchair.

6. The apparatus of claim 1, further including:
a storage medium interface in operative communication with the microcontroller; and
a portable storage medium in operative communication with the storage medium interface and storing the collection of help information.

7. The apparatus of claim 6 wherein the portable storage medium includes a removable memory device that is releasably received by the storage medium interface, the removable memory device storing the collection of help information.

8. The apparatus of claim 7 wherein the removable memory device includes a secure digital card, a compact flash card, a flash memory pen drive, a memory stick, a microdrive, a multimedia memory card, a smart media card, an xD picture card, or a subscriber identity module card.

9. A method for providing help information on a display device associated with a power driven wheelchair, including:
a) displaying content on the display device during operation or support of the power driven wheelchair;
b) detecting selective activation of a first input device;
c) in response to detection of the first input device activation, selecting help information content from a collection of help information, the selected help information content being contextually related to multiple screen objects simultaneously displayed on the display device and associated with the operation or support of the power driven wheelchair; and
d) simultaneously displaying the contextually-related help information content for the multiple screen objects on the display device.

10. The method of claim 9, further including:
e) detecting selective activation of a second input device; and
f) in response to detection of the second input device activation, designating a first screen object from the multiple screen objects simultaneously displayed as active within the screen content;
wherein the selected help information content is contextually related to the first screen object within the screen content displayed on the display device.

11. The method of claim 9 wherein the screen objects include a menu item, an active text object, a check box, an icon, a control button, or a radio button.

12. The method of claim 9, further including:
e) displaying the contextually-related help information content on the display device in a full screen view, a window, or a dialog box.

13. The method of claim 9, further including:
f) retrieving the contextually-related help information content from a portable storage medium via a storage medium interface associated with the power driven wheelchair.

14. The method of claim 13 wherein the portable storage medium includes a removable memory device that is releasably received by the storage medium interface, the removable memory device storing the collection of help information.

15. The method of claim 14 wherein the removable memory device includes a secure digital card, a compact flash card, a flash memory pen drive, a memory stick, a microdrive, a multimedia memory card, a smart media card, an xD picture card, or a subscriber identity module card.

16. A method for providing help information on a display device associated with a power driven wheelchair, including:
a) displaying content on the display device during operation or support of the power driven wheelchair, the content displayed during at least a portion of the operation or support including multiple screen objects simultaneously displayed;
b) detecting activation of a screen navigation control;
c) in response to detection of the screen navigation control activation, designating a first screen object from the multiple screen objects simultaneously displayed as active within the content;
d) detecting selective activation of a help switch;
e) in response to detection of the help switch activation, selecting help information content from a collection of help information, the selected help information content being contextually related to the active screen object and the content of the multiple screen objects simultaneously displayed on the display device and associated with the operation or support of the power driven wheelchair; and
f) displaying the contextually-related help information content on the display device.

17. The method of claim 16 wherein the screen navigation control includes at least one of a right activation, a down activation, an up activation, or a left activation.

18. The method of claim 16 wherein the screen objects include a menu item, an active text object, a check box, an icon, a control button, or a radio button.

19. The method of claim 16, further including:
g) displaying the contextually-related help information content on the display device in a full screen view, a window, or a dialog box.

20. The method of claim 16, further including:
g) retrieving the contextually-related help information content from a removable memory device via a storage medium interface associated with the power driven wheelchair, the removable memory device being releasably received by the storage medium interface and storing the collection of help information.

21. The method of claim 20 wherein the removable memory device includes a secure digital card, a compact flash card, a flash memory pen drive, a memory stick, a microdrive, a multimedia memory card, a smart media card, an xD picture card, or a subscriber identity module card.

22. An apparatus associated with a power driven wheelchair, including:
a display device to selectively display screen content during operation or support of the power driven wheelchair;
a first input device for selective activation; and
a microcontroller in operative communication with the display device and the first input device;
wherein the microcontroller includes logic to control the screen content displayed on the display device during the operation or support and detects activation of the first input device; and
wherein, in response to detection of the first input device activation, the microcontroller executes logic for:
retrieving the current screen content, wherein the current screen content includes multiple screen objects;
selecting multiple help information content from a collection of help information, the selected multiple help information content being contextually related to the multiple screen objects simultaneously displayed on the display device;
combining the selected multiple help information for the multiple screen objects to construct a help message; and
displaying the help message.

23. An apparatus associated with a power driven wheelchair, including:
a display device to selectively display screen content during operation or support of the power driven wheelchair;
a first input device for selective activation; and
a microcontroller in operative communication with the display device and the first input device;
wherein the microcontroller includes logic to control the screen content displayed on the display device during the operation or support and detects activation of the first input device; and
wherein, in response to detection of the first input device activation, the microcontroller executes logic for:
retrieving the current screen content;
selecting help information content from a collection of help information, the selected help information content being contextually related to the screen content displayed on the display device and indicative of how specific items of the screen content are currently being used; combining the selected help information and the current screen content to construct a help message; and
displaying the help message.

24. The apparatus of claim 23 wherein in response to detection of the first input device activation, the microcontroller further executes logic for:
retrieving the current screen content, wherein the current screen content includes multiple screen objects;
selecting multiple help information content from the collection of help information, the selected multiple help information content being contextually related to the multiple screen objects simultaneously displayed on the display device; and
combining the selected multiple help information for the multiple screen objects to construct the help message.

25. A method for providing help information on a display device associated with a power driven wheelchair, including:
a) displaying screen content on the display device during operation or support of the power driven wheelchair;
b) detecting selective activation of a first input device;
c) in response to detection of the first input device activation; retrieving the current screen content, wherein the current screen content includes multiple screen objects; selecting multiple help information content from a collection of help information, the selected multiple help information content being contextually related to the multiple screen objects simultaneously displayed on the display device; and combining the selected multiple help information for the multiple screen objects to construct a help message; and
d) displaying the contextually-related help message on the display device.

* * * * *